Figure 1:
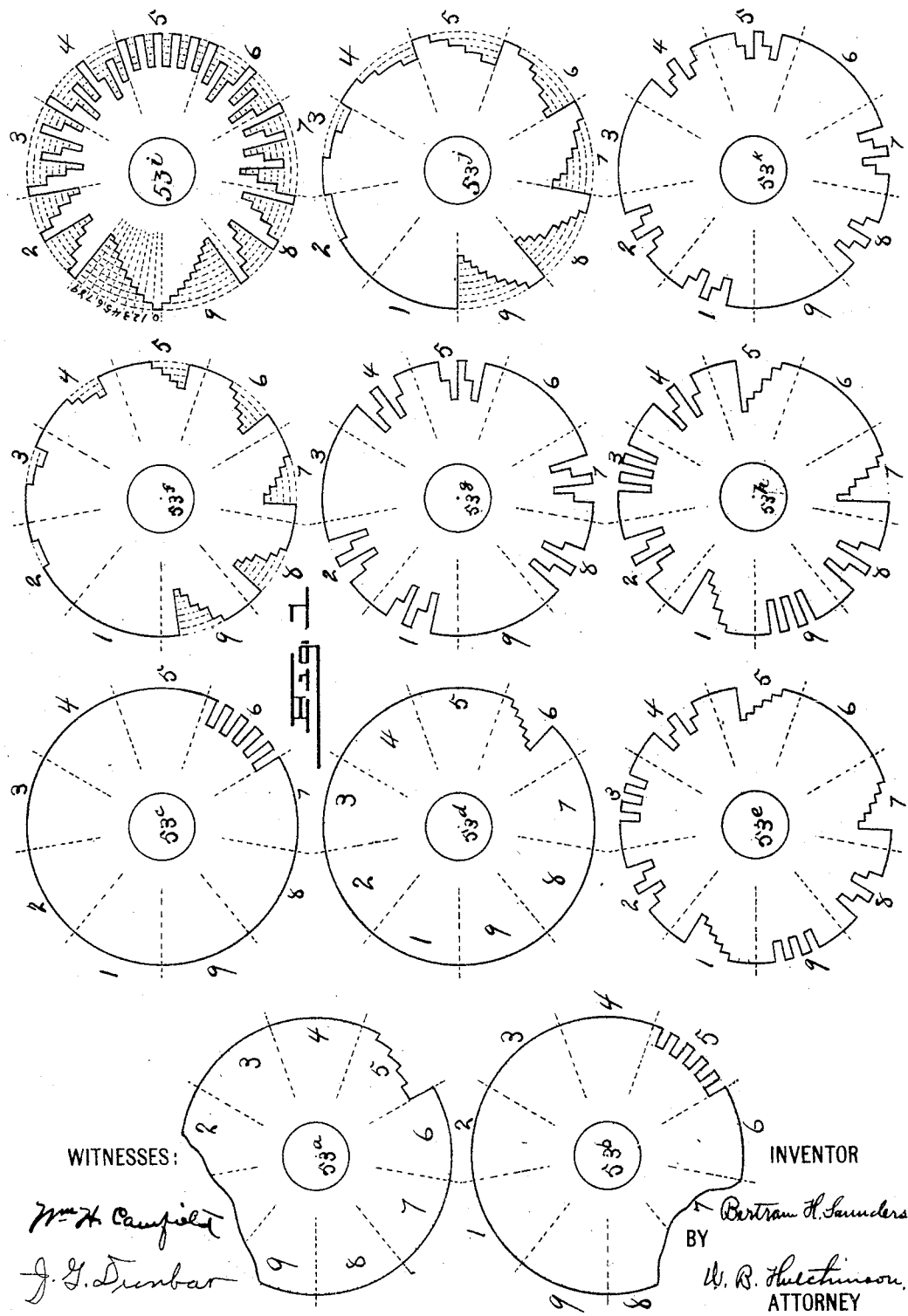

No. 775,939. PATENTED NOV. 29, 1904.
B. H. SAUNDERS.
CALCULATING MACHINE.
APPLICATION FILED MAY 22, 1902.
NO MODEL. 10 SHEETS—SHEET 1.

No. 775,939. PATENTED NOV. 29, 1904.
B. H. SAUNDERS.
CALCULATING MACHINE.
APPLICATION FILED MAY 22, 1902.
NO MODEL. 10 SHEETS—SHEET 2.

WITNESSES:
Wm H Canfield
J. G. Dunbar

INVENTOR
Bertram H. Saunders
BY
W. B. Hutchinson
ATTORNEY

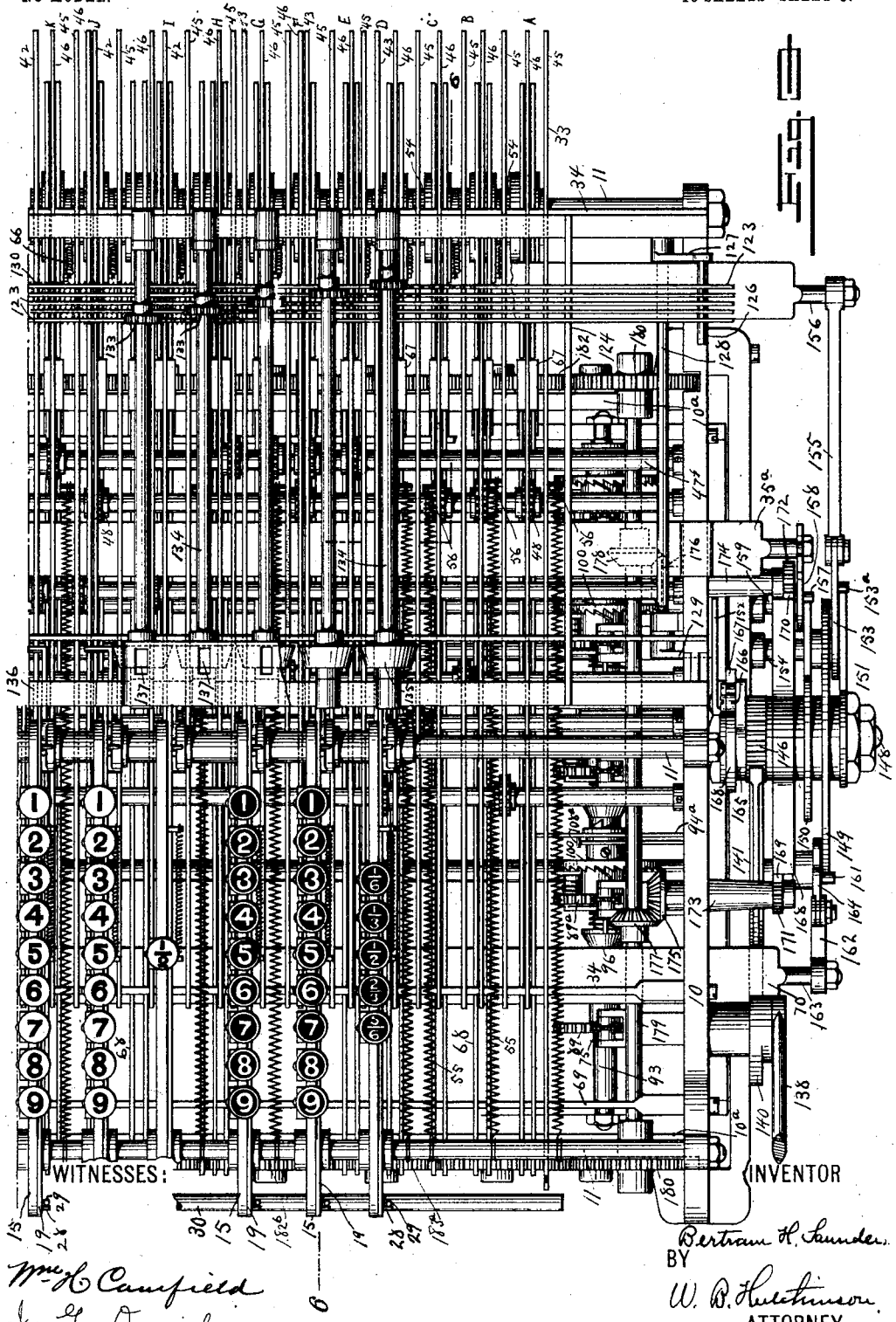

No. 775,939. PATENTED NOV. 29, 1904.
B. H. SAUNDERS.
CALCULATING MACHINE.
APPLICATION FILED MAY 22, 1902.
NO MODEL. 10 SHEETS—SHEET 4.
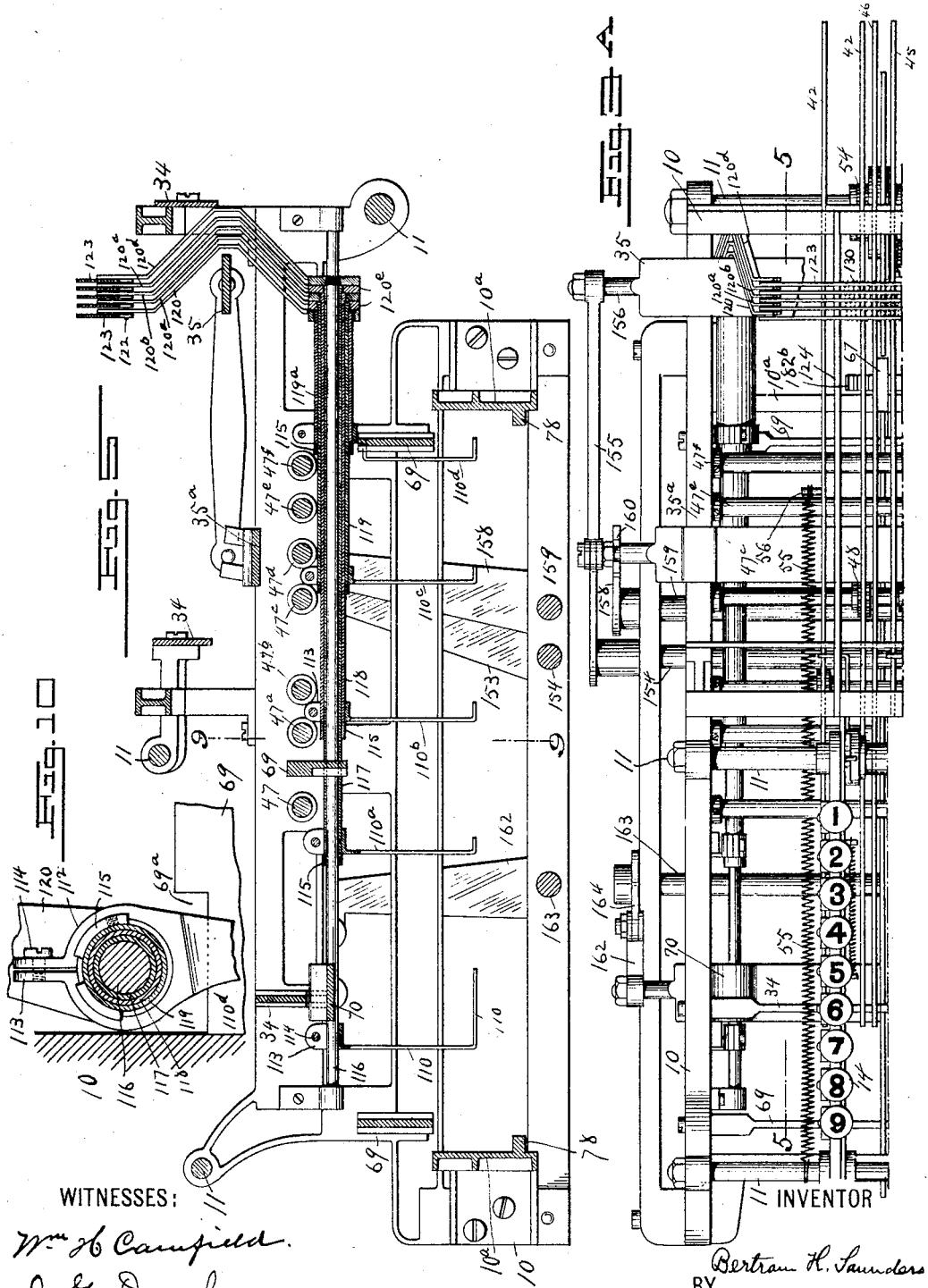

No. 775,939. PATENTED NOV. 29, 1904.
B. H. SAUNDERS.
CALCULATING MACHINE.
APPLICATION FILED MAY 22, 1902.
NO MODEL. 10 SHEETS—SHEET 5.
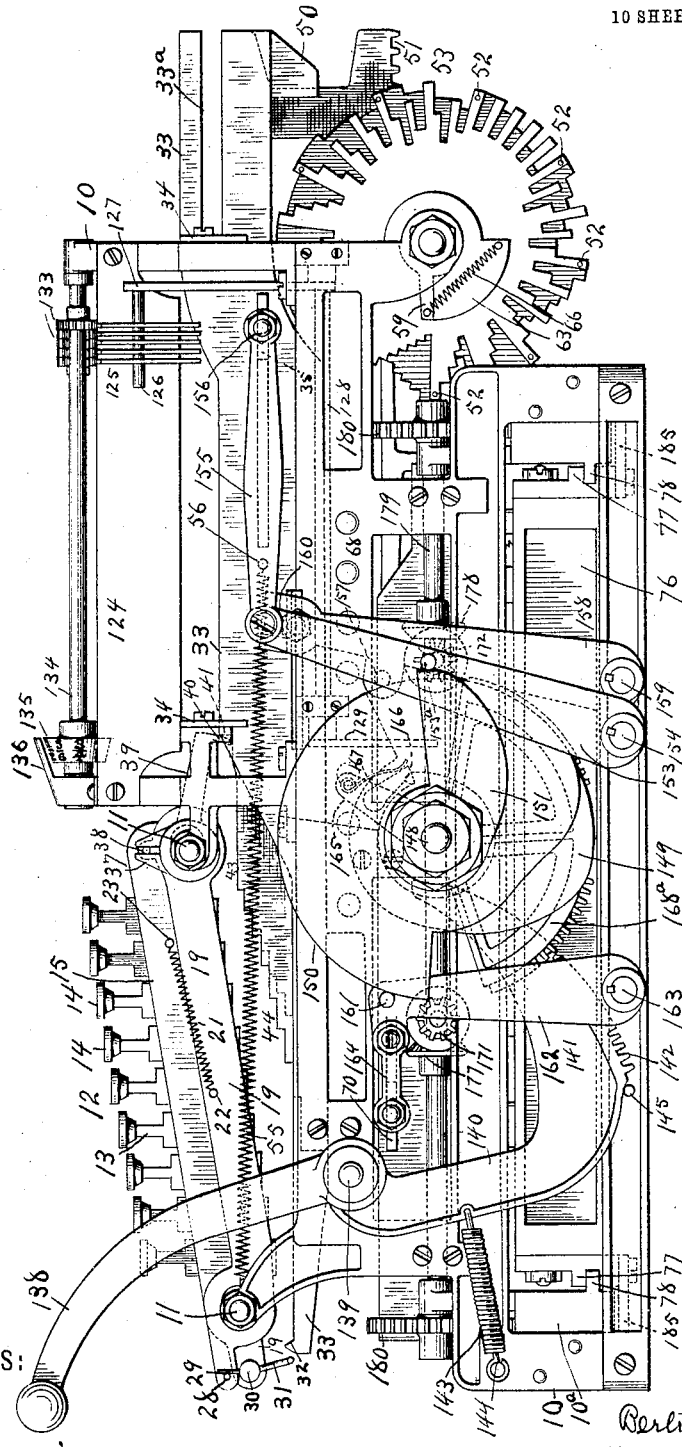
WITNESSES:
Wm. H. Canfield
J. L. Dunbar
INVENTOR
Bertram H. Saunders.
BY
W. B. Hutchinson,
ATTORNEY No. 775,939. PATENTED NOV. 29, 1904.
B. H. SAUNDERS.
CALCULATING MACHINE.
APPLICATION FILED MAY 22, 1902.
NO MODEL. 10 SHEETS—SHEET 6.
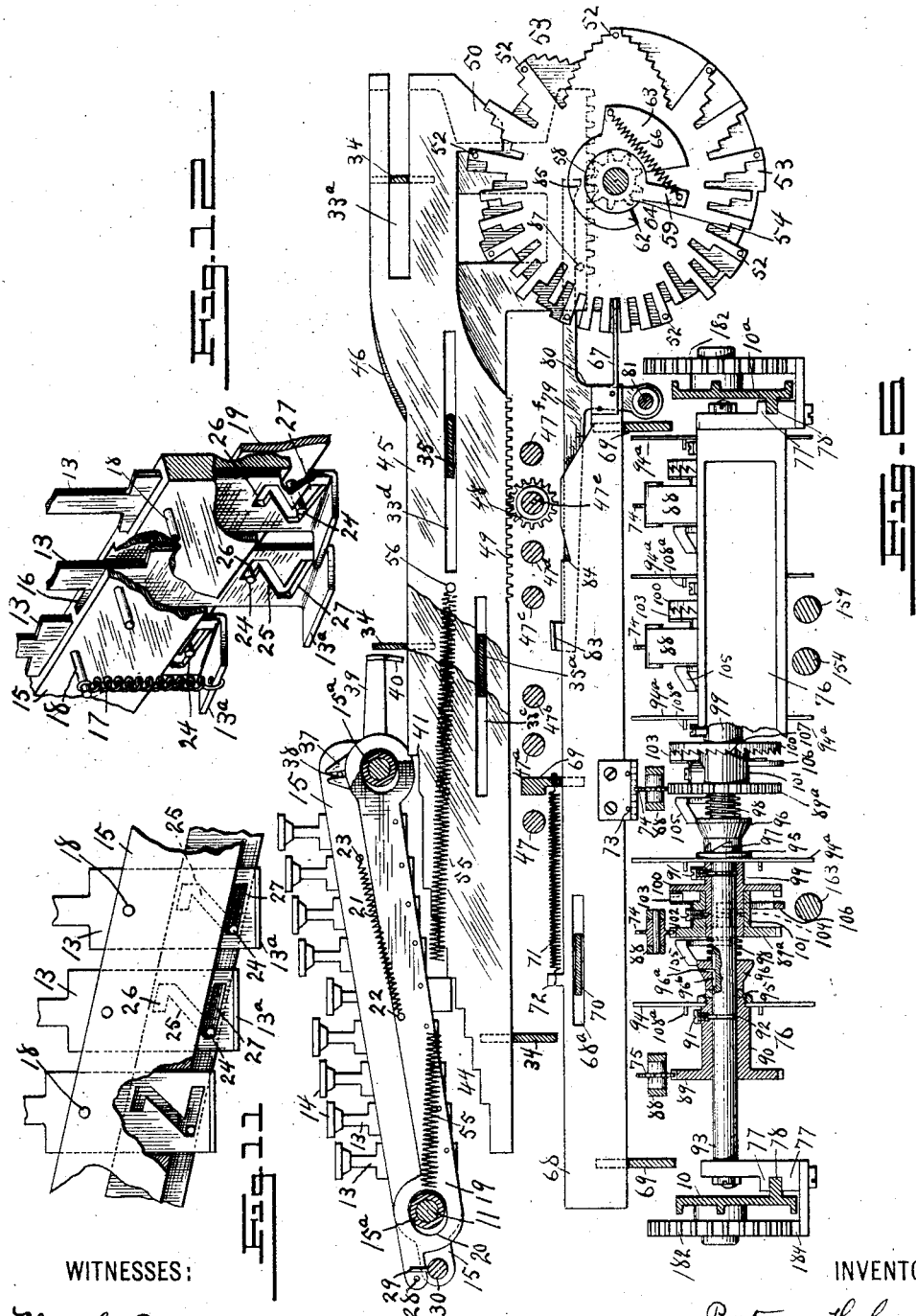
WITNESSES:
Wm H Canfield
J. G. Dunbar
INVENTOR
Bertram H. Saunders,
BY
W. B. Hutchinson
ATTORNEY

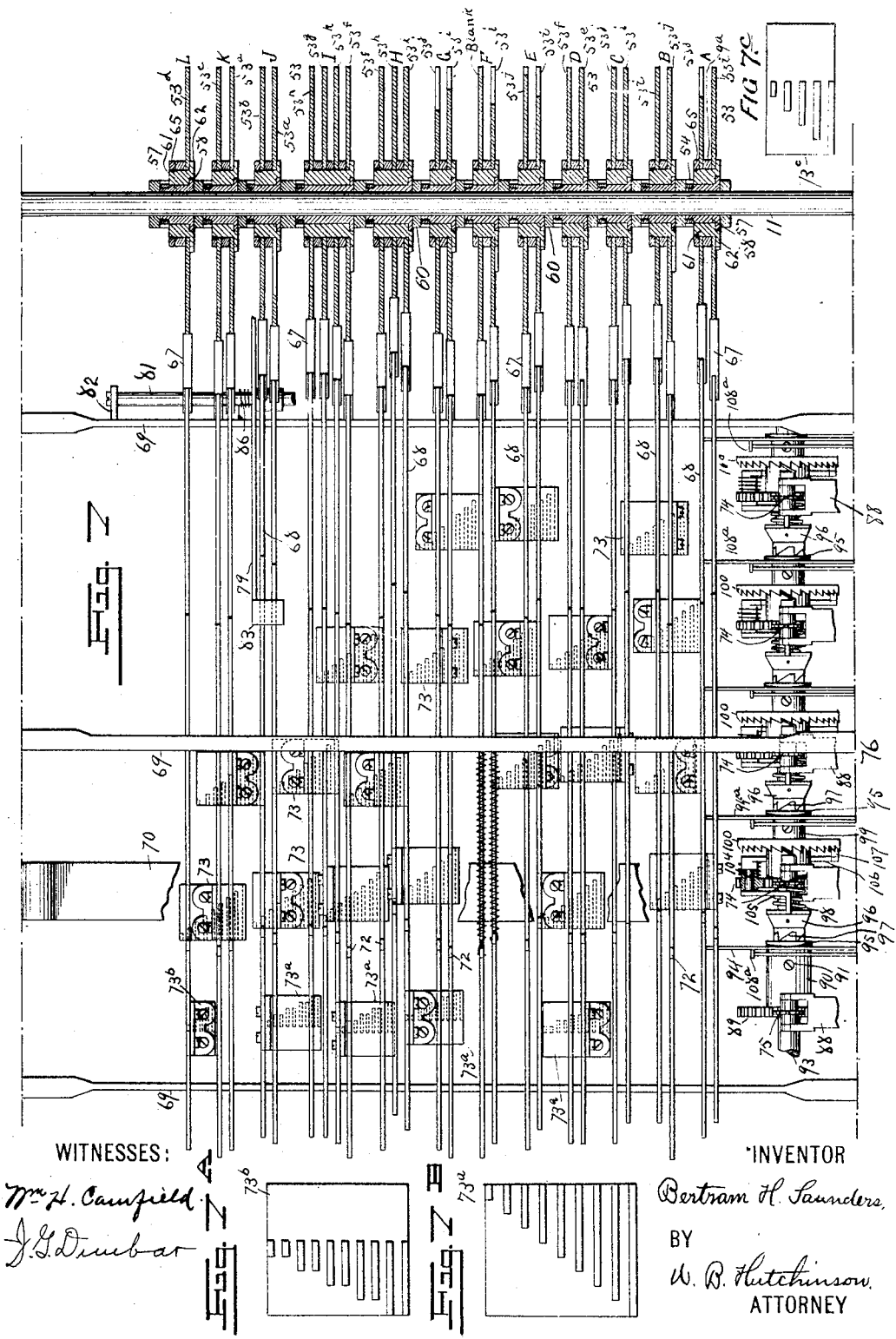

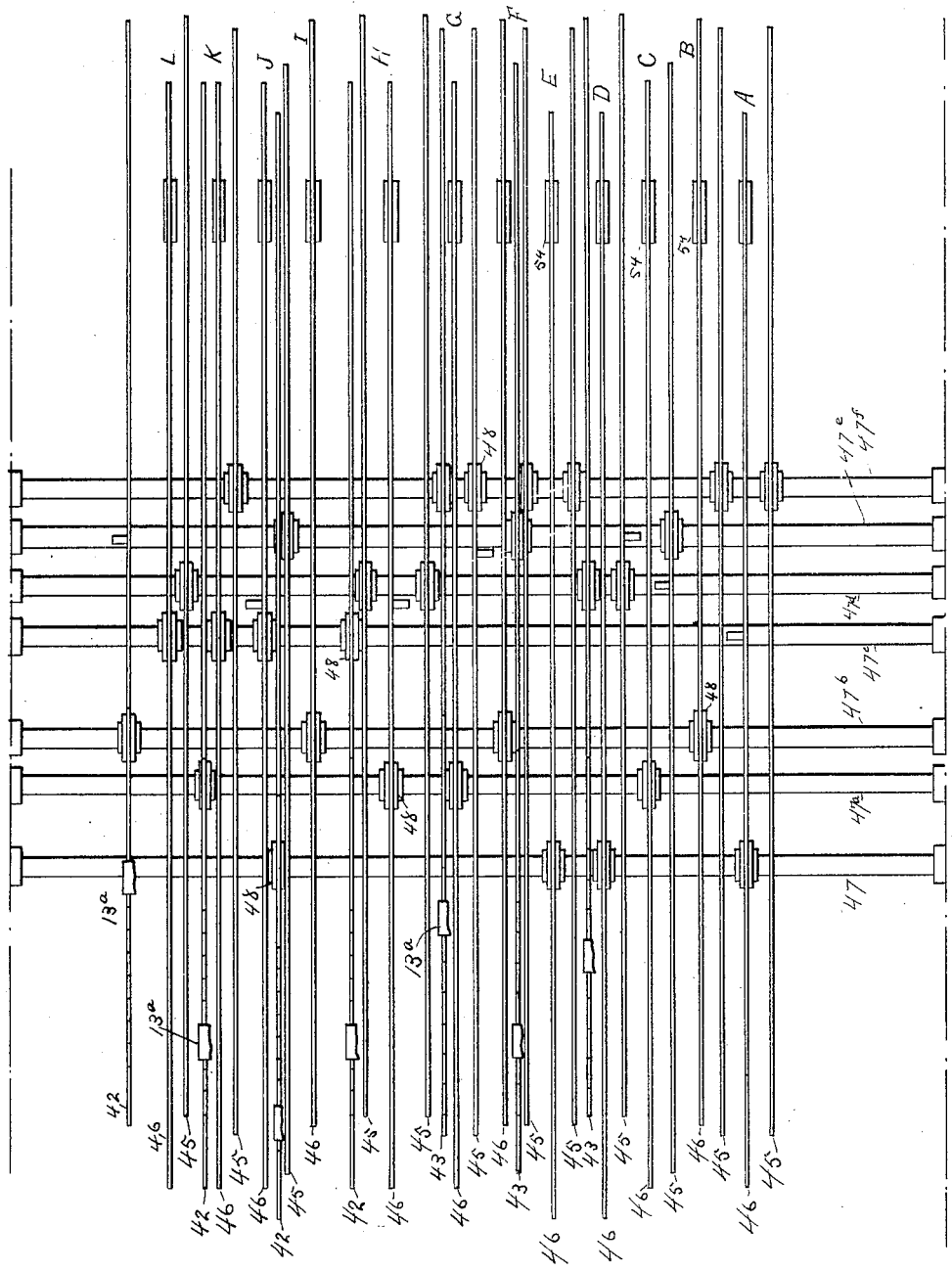

No. 775,939. PATENTED NOV. 29, 1904.
B. H. SAUNDERS.
CALCULATING MACHINE.
APPLICATION FILED MAY 22, 1902.
NO MODEL. 10 SHEETS—SHEET 9.
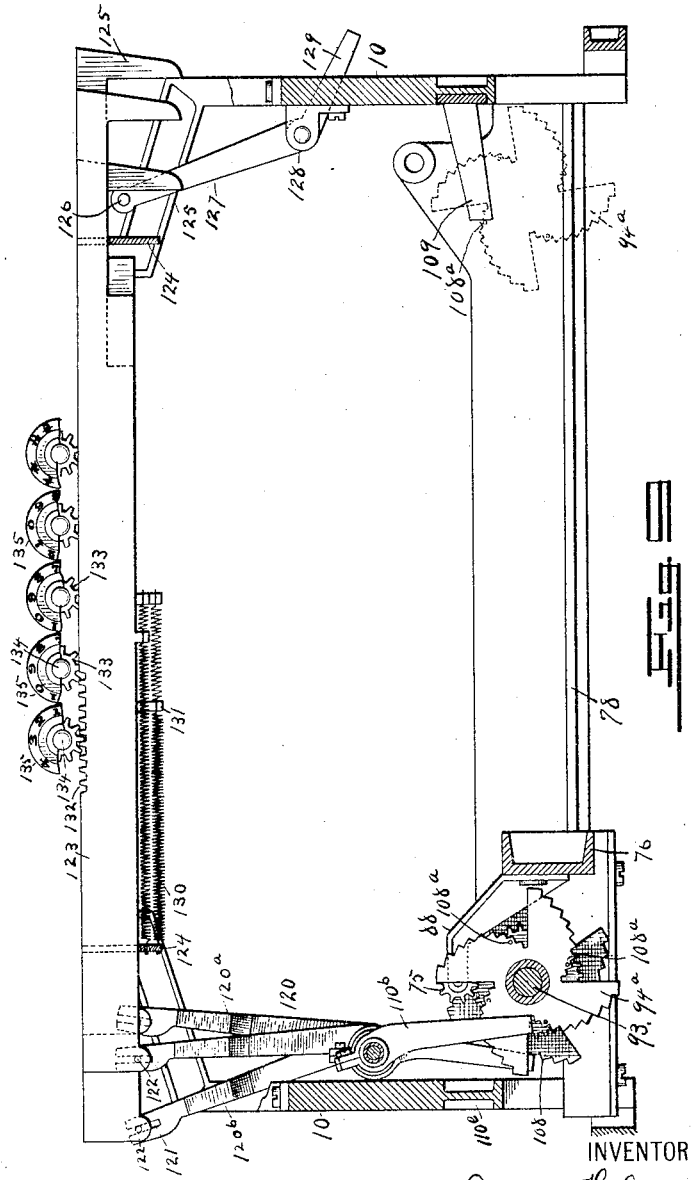
Witnesses
Wm H Canfield
L. G. Dunbar
INVENTOR
Bertram H. Saunders,
BY
W. B. Hutchinson
ATTORNEY

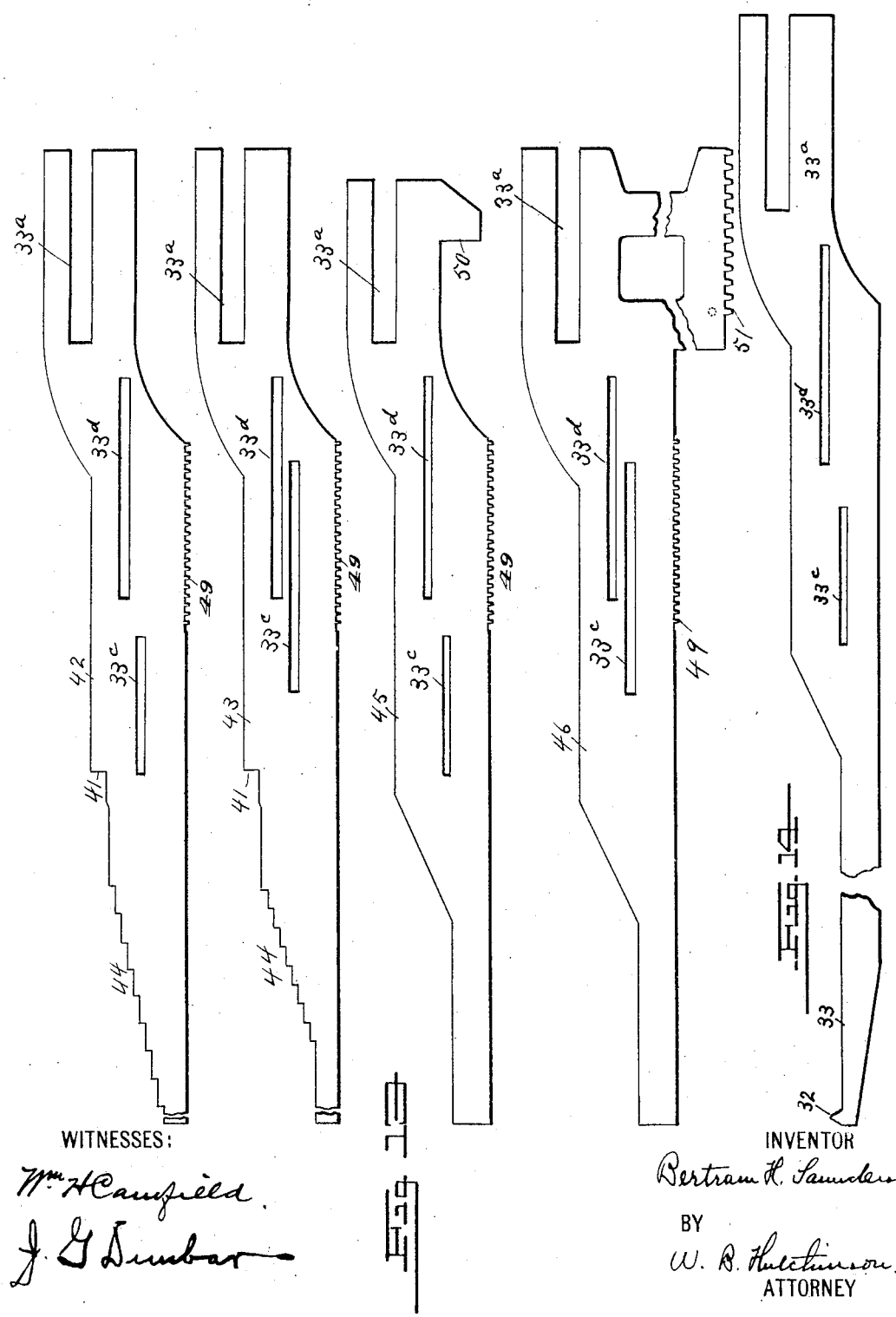

No. 775,939. Patented November 29, 1904.

UNITED STATES PATENT OFFICE.

BERTRAM H. SAUNDERS, OF CLIFTON, NEW JERSEY.

CALCULATING-MACHINE.

SPECIFICATION forming part of Letters Patent No. 775,939, dated November 29, 1904.

Application filed May 22, 1902. Serial No. 108,500. (No model.)

*To all whom it may concern:*

Be it known that I, BERTRAM H. SAUNDERS, of Clifton, Passaic county, New Jersey, have invented certain new and useful Improvements in Calculating-Machines, of which the following is a full, clear, and exact description.

My invention relates to improvements in calculating-machines; and the object of my invention is to produce a machine which will solve all problems in multiplication quickly and easily, and especially to produce a machine in which the operations of certain parts do not have to be repeated to any extent by the operator in solving a problem, to the end that mistakes may be avoided, as it is very easy for an operator to get confused in moving a certain part a definite number of times and become uncertain as to whether he has moved the said part, say, five or six times. In my machine the keys are arranged in banks and with the digits thereon including fractions, and the operator merely presses the necessary keys which indicate the numbers used in the computations, and then by a simple movement of a lever all the calculations are systematically, accurately, and mechanically carried out. In other words, I contemplate producing a machine in which the operator merely indicates the numbers to be computed, the remainder of the work being done by the machine when the lever is given a single movement.

A further object of my invention is to produce a machine in which no complex formulas are required for its successful working, thus still further rendering mistakes unlikely.

With these ends in view and with the further end of producing generally a calculating-machine which shall be accurate in action and simple in use my invention consists of certain features of construction and certain combinations and organizations of parts and groups of mechanism, which will be hereinafter described and claimed.

Reference is to be had to the accompanying drawings, forming part of this specification, in which similar characters of reference refer to similar parts throughout the several views.

Figure 2:
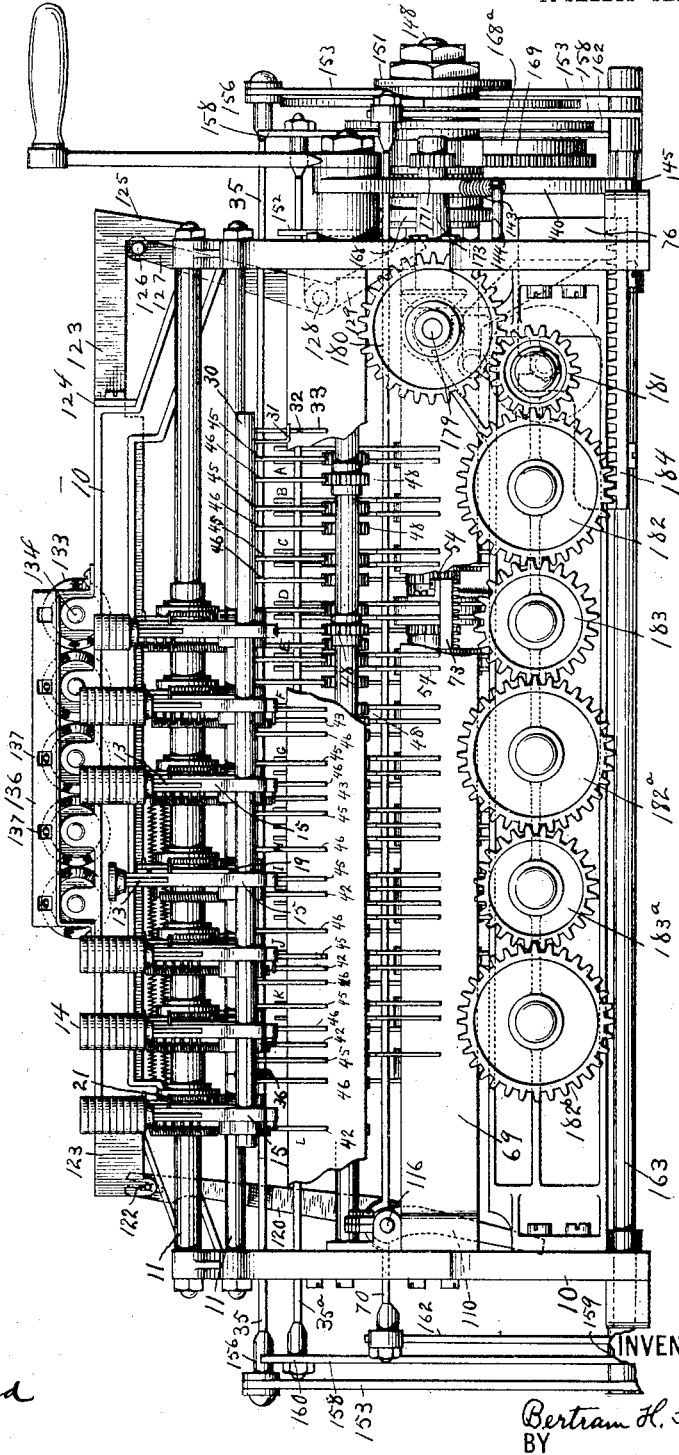

Figure 1 is a diagrammatic view showing a development of the primary calculating-disks. Fig. 2 is a broken front elevation of the machine, Figs. 3 and $3^a$, which will be referred to in the body of the specification as Figs. 3, showing a partly-broken plan view of the machine with the rack-plates and check-levers removed, the two views being necessary to show the complete plan without making the parts too small. Fig. 4 is a side elevation of the machine. Fig. 5 is a broken longitudinal section on the line 5 5 of Fig. $3^a$. Fig. 6 is a vertical longitudinal section on the line 6 6 of Fig. 3, showing a broken view of the carriage. Fig. 7 is a broken view, partly in horizontal section, of the finger-bars, the primary calculator-disks, and the calculator-carriage. Figs. $7^a$, $7^b$, and $7^c$ are detail views showing the toothed surfaces of the several rack-plates used in the machine. Fig. 8 is a diagrammatic plan of the communicating mechanism. Fig. 9 is a vertical cross-section on the line 9 9 of Fig. 5, showing the registering mechanism and the calculator-carriage with the other mechanism removed. Fig. 10 is an enlarged detail sectional view of one of the registering-levers, showing how it is fastened to its shaft. Fig. 11 is a broken detail perspective view of the key mechanism, taken from the reverse side to that shown in the principal views of the machine. Fig. 12 is a broken perspective view of the parts shown in Fig. 11, one of the keys being depressed. Fig. 13 is a detail side elevation of the various racks employed in the communicating mechanism. Fig. 14 is a detail of the trip-bar.

To make the description clearer, I shall describe the various groups of mechanism consecutively, taking up in order the key mechanism, the communicating mechanism, the primary calculator, the secondary calculator or carriage, the registering mechanism, and the actuating mechanism.

The machine is provided with a frame 10, which can be of any suitable construction and the opposite parts of which are shown tied together by tie-bars 11, which brace the machine and serve also as supports for parts of the mechanism to be hereinafter described.

On the front upper part of the machine are the key-banks 12, and, as shown, the machine has seven of these key-banks—three with white keys with the digits from "1" to "9,"

one with a "½" key, also white, two with black keys bearing the digits from "1" to "9," and one with black keys bearing the fractions from "⅙" to "⅚." The construction of these key-banks is exactly similar whether there are more or less keys, the difference being only in the number of keys. Each key 13 is arranged to slide vertically in the key-bar 15, these bars being parallel with each other, as shown in Figs. 3 and 3ª, and each key-bar carrying a row of keys, as illustrated. The key 13 slides in slot 16 in the said key-bars 15 and is normally pressed upward by a spring 17, which is secured to the lateral foot 13ª on each key and to a pin or equivalent 18 on the key-bar 15. At its ends the key-bar 15 has hollow studs 15ª, which are secured to the tie-bars 11, as shown best in Fig. 6. At the side of each key-bar and on a little lower plane is a slide-bar 19, which has a very slight longitudinal movement, the bar having at the ends, as shown in Fig. 6, elongated holes 20, which fit over the studs 15ª. The slide-bar is normally pressed rearward by a spring 21, (see Fig. 6,) which is attached, as shown at 22, to the slide-bar 19 and, as shown at 23, to the key-bar 15. The slide-bar 19 has also opposite each key 13 and at a point below the key-bar 15 a laterally-extending pin 24, which enters the Z-shaped slot 25 in the opposite key, as shown clearly in Figs. 11 and 12, this slot having its middle portion inclined and its upper and lower part formed into horizontal legs 26 and 27, the former of which is much shorter than the latter, so that when a key 13 is depressed the pull of the string 21 will cause the slide-bar 19 to be moved, when the pin 24 comes into registry with the part 26 of the Z-shaped slot, thus forcing the pin into the slot, as shown in Fig. 12, and locking the key in its depressed position, while the other pins on corresponding keys will enter the lower legs 27, as shown in the same figure referred to, and so lock all the keys save the one depressed in their upper or normal positions, thus making it impossible to confuse operations and to depress another key while the operation is going on.

The means for releasing the keys and slide-bars is as follows: At the forward end of each slide-bar 19 is a little pin 28, which engages with a pin 29 on the transverse shaft 30, this being journaled in the ends of the key-bars 15. On the under side of the shaft 30 and near one end (see Fig. 2) is a depending bent arm or dog 31, which engages the inclined spur 32 on the upper edge and outer end of the bar 33, which slides to a limited extent longitudinally of the machine in guides 34, (see Fig. 4,) and this bar (shown in detail in Fig. 14) is provided at its rear end with a slot 33ª, the function of which will hereinafter appear, also with a slot 33ᵈ for the reception of the transverse master-bar 35ª, which extends across the machine transversely through the said slot and through the slots of the rack-bars to be hereinafter referred to. The trip-bar 33 is also provided with still another slot, 33ᶜ, which will also be hereinafter referred to.

When the master-bar 35, which is operated in a way to be hereinafter described, releases the trip-bar 33 by moving forward the said trip-bar, the trip or spur 32 strikes the dog 31 and passes it; but this motion does not disturb the keys, because the pins 29 are caused to move away from the pins 28, and when the trip has passed the dog the pins are brought back into light contact with each other by the spring 36, which, as shown in Fig. 2, is fastened at one end to a pin on the shaft 30 and at the other to one of the guide-bars 11. When all the parts of the machine are being returned to their normal position, the master-bar 35, contacting with the rear end of the slot 33ᵇ in the trip-bar 33, carries the bar back and brings the spur 32 past the dog or arm 31, which it trips in its passage, giving the shaft 30 a partial rotation and causing the pins 29 to press hard enough against the pins 28 to draw forward the slide-bar 19 against the action of the spring 21, thus bringing the pin 24, with depressed key 13, out of the leg 26 of the slot 25, thereby allowing the said key to rise to its normal position. The shaft 30 after being tripped is immediately released to the control of the slide-bars 19, and their springs and both slide-bars and shaft return to their normal position.

Referring to Figs. 4 and 6, it will be noticed that on the rear stud 15ª of each key-bar 15 and at the side of the slide-bar 19 is a catch in the form of a bell-crank lever, one arm 37 of which extends upward and is slotted to receive a pin 38, which is carried by the slide-bar 19 or by a part attached thereto, and the catch has a rearwardly-extending arm 39, terminating in a depending lug 40, which is adapted to engage the step 41 of the governing rack-bar 42 or 43, as the case may be. These governing rack-bars are similar except for the slightly-different arrangement of the slots 33ᶜ in each and the further fact that the steps 44 of the governing rack-bar 43, which is the multiplier-bar, are longer than the steps on the bar 42, thus, as compared with the bar 43, providing for a shorter movement between each step on the bar and its corresponding key. The governing rack-bars have slots 33ᵈ and 33ᶜ, which are adapted to register with the corresponding slots in the trip-bar 33, already referred to, so that the master-bar 35 can extend through the slots 33ᵈ in the whole series of rack-bars and the trip-bar, while the master rod or bar 35ª extends in the same way through the slots 33ᶜ of the series. The function and operation of these master-bars will be hereinafter fully described.

The lug or catch 40, above referred to, lies normally in front of the step 41, above mentioned, and when a key is depressed and the slide-bar 19 has been carried forward, as already described, the action will be transmitted by the pin 38 to the catch 37 39, thus tilting the catch and lifting the lug 40 from the path of the step 41, thereby allowing that particular bar when released by the actuating mechanism, to be hereinafter described, to slide forward until one of its steps 44 (see Figs. 6 and 13) engages with the depressed key. There are as many of these steps 44 as there are keys in its particular key-bank, and therefore the step which engages the key will correspond in number to the number of such key.

There is a governing rack-bar 42 or 43 for each key-bank, the said governing rack-bar controlling a series of sliding rack-bars 45 or 46 through one of the shafts 47, $47^a$, $47^b$, $47^c$, $47^e$, or $47^f$, there being a shaft for each governing rack-bar, and the governing rack-bars 42 and 43 are toothed on the under side, as shown at 49 in Fig. 13, the said tooth part engaging with a pinion 48 on its particular shaft, and as the rack-bars 45 and 46 are likewise geared to the shafts it will be seen that the governing rack-bar will by its movement control the movements of all the rack-bars 45 and 46 which happen to be geared to the same shaft. The rack-bars 45 and 46 are similar in construction, except that the former has at its rear end and under edge a spur 50, which has an abrupt straight shoulder on its inner side and is adapted to engage one of the pins 52 (see Fig. 6) of the primary calculator-disks 53, while the rack-bar 46 has instead of the spur 50 a rack 51, which engages the pinion 54 on the hub of its appropriate primary calculator disk 53.

It will be seen then that as each shaft is controlled by a governing rack-bar and as there is a shaft for each key-bank the rotation of the shaft and the movement of the bar depends on the key which is depressed. When, as in the case of the numeral "10," it is not necessary to depress a key on a certain bank, there being no "0" on the key-bank, "0" being computed by omitting to depress the key on the bank where it would naturally come, the lug 40 is not raised, and therefore when the governing rack-bars are allowed to move forward the bar adapted to act on the key-bank where the keys are all at normal will not move, because it is held by the lock 40, so that the shaft controlled by that key-bank will not rotate and all the rack-bars 45 or 46 in mesh with the pinions on that particular shaft will remain stationary. The rotation of these shafts 47, $47^a$, $47^b$, $47^c$, $47^d$, $47^e$, and $47^f$ is caused upon the release of the master-bars 35 and $35^a$ by helical springs 55, which are attached at their forward end to one of the tie-bars 11 and at their rear ends to the pins or studs 56 on one of the rack-bars. It will be seen that one of these springs attached to one rack-bar in a series in mesh with the pinions of any single shaft will through the shaft actuate all the rack-bars of the series, so that there is one spring for each shaft and one to operate the sliding trip-bar 33, making eight springs in all. These rack-bars 45 and 46 and the shafts with which they gear communicate to the primary calculator-disks 53 the numbers depressed on the key-board and are therefore termed the "communicating mechanism."

The key-banks which are supplied with the black keys (see Fig. 3) are the ones on which the number to be multiplied is indicated, and these key-banks control, as described, the rack-bars 46, which have their teeth 51 in mesh with the gears 54 of the primary calculator-disks 53, so that the movement of these bars determines the degree of rotation of the said calculator-disks. These disks 53 serve to regulate the movement of the finger-bars, and indirectly they control the gears which transmit certain computations of the machine, as will hereinafter be clearly pointed out. The key-banks having the black keys, Fig. 3, are the ones on which the multiplier is indicated. These key-banks control the rack-bars 45, which have at their rear end the spurs 50.

When the lever 138 is actuated, the rack-bars having the teeth 51 move forward, rotating the primary calculator-disks 53 through a partial rotation, the degree of which is, as stated, determined by the key which is depressed. Immediately following this movement the rack-bars having the spurs 50 move into contact with whichever of the pins 52 happens to come in their path. After contacting with the pins 52 the spurs continue their forward travel until stopped by the keys governing them, giving the disks 53 a slight additional rotation. The four series of rack-bars 46 and the four governing rack-bars 43 which control them are acted upon by the master-bar 35 of the actuating mechanism, which acts upon the rear ends of the slots $33^d$ of the several rack-bars, and the rack-bars can only move forward when the master-bar is drawn forward, as hereinafter described, to permit their movement. They are brought back again to normal position by the return or rearward movement of the master-bar 35. The rack-bars 45, having the spurs 50, are also controlled by a master-bar $35^a$, which works exactly like the master-bar 35, except that it is in the slots $33^c$ (see Figs. 13 and 14) of the several rack-bars and is adapted to act only upon the bars 45, because the slots $33^c$ in these bars are short, and the master-bar $35^a$ will contact with the rear end of the slots, while, because the slot $33^c$ in the bars 46 is long, the master-bar $35^a$ will not act upon them at all. It will be seen then that both series of rack-bars have the slots $33^c$ and $33^d$; but in the case of the bars 46 the slots 33ᶜ are only for clearance, and in the case of the bars 45 the slots 33ᵈ are only for clearance.

The construction and arrangement of the primary calculator-disks 53 will be clearly seen by reference to Figs. 4, 6, and 7. The disks are mounted in groups on hubs, which rotate on one of the tie-bars 11, and they are separated by collars 60, as shown best in Fig. 7. Each group of disks 53 has a composite hub, which consists of an inner sleeve 57, having at one end a flange 58, which at one point is prolonged to conform to the radial arm 59. (Shown best in Fig. 6.) At the other end the sleeve is secured to the gear 54, already referred to. On each sleeve 57 is journaled a second sleeve 61, having the end flange 62, which at one part is prolonged or exaggerated to form a segment 63 (see Fig. 6) and at another point is cut away segmentally, as shown at 64 in the same figure. The inner flange 58 is let into the sleeve 61, so that the flanges 58 and 62 are in the same vertical plane, and the arm 59, above referred to, has an oscillatory movement in the cut-away portion 64 of the flange 62. The several disks 53 and their separating collar or collars 60 are held on the part or sleeve 61 of the hub and against the flange 62 by a nut 65, as shown in Fig. 7. One of the disks 53 of each group carries the nine pins 52, above mentioned, and these are adapted to be engaged by the spurs 50 of the rack-bars 45, above named. It will be noticed that the outer sleeve 61 of the disk-hubs can be rotated on the inner sleeve 57 a distance corresponding to the movement of the arm 59 in the recess 64. The arm 59 is held normally in contact with one edge of the segment 63 by a spring 66, (see Fig. 6,) one end of which is attached to the arm 59 and the other to the segment 63. The gears 54 have nine teeth, so that the movement of the rack-bars 46, having the teeth 51, which engage the gears a distance of one tooth, rotates the hubs of the disks 53 one-ninth of their circumference, the movement of the bar two teeth will rotate the hub two-ninths, and so on.

When the hubs are rotated by the rack-bars 46 to a point where the rack-bars 46 are prevented from further movement by the stepped ends of their governing rack-bars abutting with the depressed keys, the inner sleeves 57 of the hubs will be held against further movement, because the gears 54 and racks 51 are in mesh; but when the rack-bars 45 bring the spurs 50 into contact with one of the pins 52 the sleeve 61 rotates slightly on the hub or sleeve 57 and arm 59 is moved against the tension of the spring 66, as shown in Fig. 6.

The disks 53 are all constructed on a circle divided into nine sectors, as shown in Fig. 1, and each sector is divided into nine subsectors. The rack-bars 46 are arranged so as to alway bring the first or zero subsector of a disk opposite the finger 67 of a finger-bar 68, as shown in Figs. 6 and 7. The function of the spur 50, then, after the rack 51 has determined which of the sectors of the disk 53 is to be acted on by the finger-bar, is to determine which of the subsectors of that sector is to be brought into line with the said finger 67 of the finger-bar 68. It will be noticed, however, that this fact is primarily determined by the keys 13 which are depressed.

There is a series of the finger-bars 68, which are arranged to move longitudinally in suitable transverse guide-plates 69, and each finger-bar has at its rear end the finger 67, adapted to contact when the bar is released with that part of the primary calculator-disk 53 which happens to be in line with the finger, whether it be the peripheral edge of the disk or one of the steps or gradients of its recesses. By reference to Fig. 7 it will be seen that there is a finger-bar 68 for each disk 53. The finger-bars are held normally from moving by the master-bar 70 and its controlling mechanism. This master-bar extends transversely through slots 68ᵃ (see Fig. 6) in the finger-bars 68. The master-bar holds the finger-bars with their fingers just clear of the periphery of the disks 53, and the finger-bars are actuated when released by the springs 71, which are fastened to the finger-bars, as shown at 72, and to some adjacent abutment—as, for instance, a guide-plate 69.

Each finger-bar 68 carries on the under side a horizontally-arranged rack-plate 73, which is constructed with a series of graduated teeth, which are adapted to engage the counting-pinions 74 of the carriage 76, and the movement of the finger-bars brings the rack-plates into alinement with the pinions of the carriage or brings the requisite number of teeth into such alinement, as presently described. Some of the finger-bars carry a slightly-modified form of the rack-plates 73ᵃ and 73ᵇ, which are adapted to engage the pinion 75 (see Figs. 6 and 7) of the carriage 76.

The organization of the disks, finger-bars, and rack-plates is best shown in Fig. 7, where the disks appear in section with the finger-bars 68, which have been released to the action of the springs 71, having their fingers 67 in abutment with the disks 53. The movement of the finger-bars is determined by the depth of the recesses in the disks 53, into which the finger-bars enter, and movement is entirely prevented where the fingers 67 abut with the periphery or unrecessed parts of the disks. By reference to Fig. 7 it will be seen that before the finger-bars 67 are released the rack-plates 73 lie in five perfectly alined series, each series being just a little to one side of the path of the carriage-pinions 74 and 75. The teeth of the rack-plates 73, 73ᵃ, and 73ᵇ are adapted, as stated, to engage the pinions 74 and 75 of the carriage, and it will be noticed that they are divided at right angles to the finger-bars 68 into nine parts, each part having a progressively-increasing number of teeth, or, in other words, the teeth are of progressively-decreasing length, so that the number of teeth which engage a given pinion depends on the movement forward or backward of the rack-plate. The teeth on the rack-plate are of successively-increasing lengths, so that, in effect, one part of the rack-plate may have one tooth, the next two teeth, and so on up to nine to engage with the aforesaid pinions. Each rack-plate therefore has the function of nine racks side by side, each with one tooth more than the one adjoining. The rack-plates 73ª and 73ᵇ are in principle like the rack-plates 73ª, but are slightly different in the arrangement and number of their teeth, and this difference will be referred to in describing the arithmetical principle of the machine.

By reference to Fig. 1 it will be seen that the disks 53 are constructed inside the periphery upon nine concentric circles and recede so that the bottom of each recess is determined by one or the other of these circles. The distance between these circles is exactly that of one-ninth of the rack-plates 73, so that it will be seen that when the finger 67 of one of the finger-bars 68 abuts with the bottom of a recess which extends to the sixth circle the rack-plate 73 has been moved rearward until it has six teeth in the path of one of the counting-pinions 74 of the carriage, and so when the calculator-carriage 76 moves across the machine the pinion 74 will be engaged by the rack-plate 73 and turned a distance of six teeth. The action of course takes place in any number of rack-plates which may happen to be in the path of the pinions, and the rotation of the pinions will of course depend on the position of the rack-plates. Each finger-bar 68, as above remarked, holds a certain number of teeth on the rack-plate 73 in the path of the counting-pinion unless no recess is presented by a disk 53 of the finger 67 or unless the finger-bar is held from movement by the check-lever 79. One of these levers lies parallel with each group of finger-bars 68, although in the drawings (see Fig. 7) only one lever 79 is shown. The lever 79 has a dependent arm 80, which is fulcrumed on a rod 81, held, as illustrated, in lugs 82 on one of the guide-plates 69; but the rod, or in fact the check-lever, may be supported in any convenient way. At its forward end the check-lever has a laterally-extending catch 83 adapted to engage the notch 84 (see Fig. 6) of the finger-bar 68, and at its rear end and on the under side the check-lever has an inclined or cam face 85. The rear end of the lever is normally pressed down by the spring 86, (see Fig. 7,) which is coiled around the rod 81, with one end fastened to the rod or to an adjacent abutment and with the other end secured to the check-lever 79. This causes the rear end of the check-lever 79 to press against the pin 87 (see Fig. 6) of the adjacent rack-bar 46.

In the course of a computation when a disk 53 is not rotated by the tooth rack-bar 46, as in the case of a zero in a multiplicand, it often happens that a spur 50 will act upon the stationary group of disks 53. This would give an elementary computation not desired and the check-lever 79 prevents this. When a toothed rack-bar 46 controlling a group of disks 53 is not moved, the cam-face 85 at the end of the lever 79 rests on the pin 87; but if the rack-bar be advanced one tooth the cam-face 85 slides down the advancing pin until the lever 79 rests with its horizontal or flat face on the pin 87, which action lifts the catch 83 out of engagement with the notch 84 of the finger-bar 68, thereby allowing the finger-bar to move rearward if the disk 53 permits. It will be observed that the periphery of one of the disks 53 and the check-lever 79 serve to normally hold the rack-plate 73 out of the path of one of the counting-pinions 74. The primary calculator-disks 53, with their finger-bars 68, rack-plates 73, and check-levers 79, I term the "primary" calculating mechanism.

The carriage 76, above referred to, can be of any suitable construction, and I have shown it provided with parallel lugs 77 on each side, which lugs embrace and slide on inwardly-projecting lugs 78 on the main frame 10. From the above description it will be seen that when the carriage has completed its journey across the machine each pinion 74 or 75 thereon has been rotated a distance corresponding to the number of teeth presented to it by the rack-plates. The calculator-carriage 76 is made up of five sections, arranged to add together and produce the complete total of all the rack-plate teeth set by the primary calculator-disks. Of course it will be understood that if the machine is adapted to deal with larger computations as many more sections can be added to the carriage as may be required, and, as illustrated, each section consists, essentially, of the pinions 75 or 74, the connected gears 89 or 89ª, and the mechanism connecting each gear 89 or 89ª with the next ascending section for carrying purposes, as will be presently described. The carriage is shown best in Figs. 6 and 7. As shown, the most forward section—that is, the one to the left in Fig. 6, having the gear 89 and pinion 75—represents fractions, and the gear 89 has forty-eight teeth, because the fractions as arranged are expressed in twelfths and a unit is carried at each quarter-turn of the gear, or, in fact, of any gear 89 or 89ª. The other gears have forty teeth, because each quarter-turn represents a count or addition of ten, and in order that the several sections, counting from left to right in Fig. 6, after the fractions-section express units, tens, hundreds, and thousands. The pinions 74 and 75 are each journaled in an arm 88 of the calculator-carriage 76 and the pinion 75 meshes with the gear 89, which is provided with an elongated hub 90, held by a screw 91, (see Fig. 6,) fitted in a circumferential groove 92 on the tie-bar 93, so that the hub may turn but not slide on the said tie-bar. The tie-bar 93 connects the two sides of the carriage-frame. The hub 90 carries the disk 64, the function of which will be hereinafter described, and each succeeding section of the carriage is provided with a similar disk 94ᵃ. At the end of the hub 90 and of each succeeding disk-hub in the carriage-section is a clutch comprising the two parts 95 and 96, which have four meeting inclined teeth 97, adapted to carry one every time a quarter-turn is made, as will be presently shown. The clutch member 96 is pressed toward the member 95 by a spiral spring 98, arranged between the member 96 and the hub 99 of the next carriage-section, the spring 98 being arranged, as shown, around the tie-bar 93. Each clutch member 96 is held by a pin 96ᵃ, fitting in a groove 96ᵇ in the tie-bar 93, so that the said member may slide but cannot turn. The hub 99 is elongated, as shown in Fig. 6, and carries a disk 94ᵃ, the hub being held to the shaft or tie-bar 93 by a screw 91 in the same way that the hub 90 is held. The hub 99 carries the radial tooth ratchet-wheel 100, which abuts with the hub 101 of the gear 89ᵃ, the said hub 101 being held by a screw 102, so as to turn with but not slide on the hub 99. The screw 102 also serves to secure the spring-detent 103, which engages the ratchet-wheel 100 and prevents it from turning back. Extending through each gear 89ᵃ, parallel with the shaft or tie-bar 93, is a short shaft 104, (see Fig. 7,) which is journaled in the gear and carries at its forward end a bent arm 105, which engages the face of and slides on the conical clutch member 96. The rear end of the said shaft 104 terminates in a second curved arm 106, which extends partly around the hub 101 and terminates in the spring-pawl 107, (see Fig. 6,) which engages the ratchet-wheel 100 of the next ascending carriage-section. When a gear 89ᵃ is rotated a distance of ten teeth—that is, one-quarter of its full revolution—the disk 100, which is coupled to it, as described, will also be turned by reason of the ratchet connection between the two, as pointed out. At the beginning of the movement the teeth 97 of the clutch members 95 and 96 will be in close mesh; but as the rotation progresses the inclined faces of the teeth on the clutch member 97 will slide on the teeth of the opposed member, gradually forcing back the member 96 against the pressure of the spring 98, this movement continuing until the gear 89ᵃ has moved a distance of nine teeth. With the rotation of the gear one tooth more the meeting inclined faces of the clutch members 95 and 96 clear each other and the member 96 flies back to its first position, it being then in exactly the same position as when it started, except that its teeth have changed—that is, the member 95 has advanced a distance of one tooth, showing that the parts have rotated a quarter-revolution. During the rearwardly-sliding movement of the clutch member 96 the arm 105, pressed lightly by the spring-pawl 107, gradually descends the inclined or cone face of the clutch member 96, carrying the spring-pawl 107 back a distance of one tooth, and when that point is reached where the teeth 97 of the clutch members pass each other and the member 96 flies back the arm 105 is thrown suddenly outward, tilting the pawl-arm 106 and causing the pawl 107 to advance the ratchet-wheel 100 on the next ascending section a distance of one tooth, and this of course carries forward the disk 94ᵃ, which is carried with the said ratchet-wheel a corresponding distance. This operation, it will be seen, is carried on effectively whether the section to which the "1" is being carried is receiving impulse through its counting-pinion or whether it be at rest. The first or forward section of the carriage mechanism operates exactly in the same way as the other sections, with the exception that it requires a rotation of twelve teeth of the gear 89 to turn the mechanism of the first section a quarter-revolution. It will be noticed that the section which computes the figures of smallest value, which in this case are fractions, requires only the clutch to carry upward its calculations to the next higher section. It will be noticed, too, that while the several gears 89ᵃ have a rotation governed by their pinions 74 the disks 94ᵃ, which they carry, have the same rotation and also an occasional additional movement equal to one tooth of the gear 89ᵃ, communicated by the mechanism of the section as just described.

In Fig. 7 the rack-plates 73, 73ᵃ, and 73ᵇ are in position to give the result of one hundred and fifty-seven and one-half multiplied by twenty-five and one-third. The answer to this is three thousand nine hundred and ninety. If one were to add the total of the rack-plate teeth shown lying in the path of the counting-pinions of the calculator-carriage in the said figure as if they were five columns of figures, he would obtain the desired result.

For purposes of calculation the operation is finished when the carriage has passed the last rack-plate. In other words, the calculation is complete; but it is necessary or at least desirable to use registering mechanism to display the result in the required manner and at the right point. For this purpose the carriage is provided with graduated disks 94 and 94ᵃ instead of with dials. Each disk 94, 94ᵃ, &c., is divided into four sectors, and these are again divided into ten graduated steps or abutments 108, each step being on a different concentric line from its neighbor, and in the case of the disk 94 there are twelve of these substeps, because, as already described, this disk refers to the parts indicating fractions and the fractions are expressed in the instance illustrated in twelfths. Obviously the number of steps on the fractional disk would correspond with the denomination of the fractions to be expressed. On the side of each disk 94 94$^a$, &c., are four projecting pins 108$^a$, which are arranged at regular distances upon the disk in such a position that when the carriage 76 on its return journey across the machine almost reaches the starting-point the uppermost pin 108$^a$ on each disk will strike one of the fixed arms 109 on the main frame 10, (see Fig. 9,) and the length of the arms is such as to bring the disks all back to zero position. When a disk has been turned to register zero, it will not, of course, be moved on the return of the carriage, as its arm 109 will merely touch the pin 108$^a$. The steps 108 of the disks are adapted to contact with the bent arms 110, 110$^a$, 110$^b$, 110$^c$, and 110$^d$, which arms at their upper ends terminate in split rings 112, having opposed flanges 113, (see Fig. 10,) so that by suitable screws 114 in the said flanges the rings, and consequently the said arms, may be clasped to the sectional shaft 116, 117, 118, 119, and 119$^a$, which shaft is parallel with the shaft or tie-bar 93 and at such point above the same as to bring the arms 110 110$^a$, &c., into the proper relation to the communicating disks above referred to. The sectional shaft is hung in suitable bearings on the side of the frame 10 and is made up, as shown in Figs. 5 and 10, of overlapping and partially-nested hollow sections, so that each section may work independently of the others, and the several sections are properly spaced by means of collars 115 on the shaft. The several shaft-sections just referred to are each provided with upwardly-extending bent levers 120, 120$^a$, 120$^b$, 120$^c$, and 120$^d$, which are secured to the several sections, as shown best in Fig. 5, which shows the levers secured to collars 120$^e$, which are threaded to the several shaft-sections, thus the arm 110 and shaft-section 116, which communicates with the fractional section of the calculating-carriage, connects with the arm 120$^d$. The next section of the calculator-carriage communicates, through the arm 110$^a$, shaft-section 117, with the lever 120$^c$, and so on. Each of these levers 120$^e$ is split at its upper end, as shown at 121, and so has a sliding connection, by means of the pin 122, with one of the sliding indicator rack-bars 123, (see Figs. 3, 5, and 9,) there being an indicator rack-bar for each lever. The indicator rack-bars 123 have a limited sliding motion in the guides 124, which are supported above the main mechanism of the machine, and the rack-bars have at one end—the right end as you face the machine—depending lugs 125, which extend into the path of the stud 126 on the lever 127, which is secured to the shaft 128, (see Fig. 9,) and the latter has also an arm 129, which is adapted to project outward beyond the machine-frame, as shown in the figure just referred to. The function of the arms 127 and 129 will be hereinafter referred to.

The indicator rack-bars 123 are normally pressed to the left, as you face the machine, by springs 130, which are secured to a convenient abutment, as the guide 124 and to the indicator rack-bars, as shown at 131. Each indicator rack-bar is provided with a rack 132, which engages a pinion 133 on one of the shafts 134, which shafts are in parallel relation, as shown in Figs. 3 and 9, and are arranged on the machine-top, each shaft carrying, preferably at its front end, a dial 135 with the several numerals thereon, and the dials are covered by a hood 136, (see Fig. 3,) having slots 137 above the dials, so that one number of a dial will show through its slot and the several numbers which show will indicate the result of a computation, as is usual in machines of this class. At the proper time the arm 127, bearing the stud 126, is allowed to fall back, and the indicator rack-bars 123 will under the action of the springs 130 shoot to the left, carrying with them the several levers 120 120$^a$, &c., and consequently throwing inward the bent arms 110 110$^a$, &c., the arms moving toward the middle of the machine. This release of the indicator rack-bars does not take place until the calculator-carriage 76 has crossed the machine and is at rest with a stepped part of each graduated disk 94 94$^a$, &c., directly in the path of the bent arms 110, 110$^a$, and following. The depth of the graduation of the part of each disk against which the arms will thus strike will therefore limit the inward movement of the arms—that is, such movement will be limited by the steps 108, which the arms strike, and the outward movement of the levers 120, 120$^a$, and following will be similarly limited. The indicating rack-bars 123 will thus be stopped at variable points in their travel. As each bar 123 is geared to the dials 135, as already described, the proper number will consequently be displayed by the dial. This operation will be understood by reference to Fig. 9, which shows the variable position of the several communicating or transmitting parts. The carriage has received from the computing mechanism the answer to the calculation of one hundred and fifty-seven and one-half multiplied by twenty-five and one-third, as already explained, and presents the disks 94 94$^a$, &c., to the arms 110, 110$^a$, and following in such a way as to represent the answer "3990." By reference to the drawings it will be seen that one of the arms 110$^d$ is in contact with the third step 108 of one of the disks 94$^a$. The arms which communicate with the dials showing the "9's" are each in contact with the ninth step of their respective disks, while the communicating-arm connecting with the zero-dial is at the periphery of its disk.

By reference to Figs. 3 and 4 it will be seen that the indicator rack-bars 123 are close together, so that if desired the ends of the rack-bars can be provided with types by means of which a printed record of the calculations can be made. This matter, however, I have not shown in detail, as it is the subject of a subsequent application.

I have now described the mechanical movements of the various calculating parts of the machine without explaining the arithmetical principles or how the parts are actuated. I will now describe the actuating mechanism.

Power is applied to the machine through a lever 138, (see Figs. 2 and 4,) which has a suitable handle and which is mounted on a stud 139. This lever carries the dependent arm 140, (see Fig. 4,) which may, if desired, be integral with the lever and which at its lower end merges into the segment 141, having teeth 142 on the lower edge thereof. The arm 140 is normally pulled outward by a spring 143, which is attached at one end to the arm 140 and at the other to a pin 144. The teeth 142 of the segment engage the pinion 146, which is journaled on the cam-hub 147, the latter being mounted on the stud 148 on one end of the machine. (See Fig. 17.) The cam-hub is provided with the three principal cams 149, 150, and 151, which are fast on the hub and also carries the plate-cam 152. The cam 151 is adapted to engage the pin 153$^a$ on the lever or arm 153, which extends upward at the side of the machine and is keyed to the shaft 154, this shaft extending entirely across the machine and carrying at its opposite end a second arm, 153, like the first, except that it has not the pin 153$^a$, and the two arms are pivotally connected on their upper ends by the pitman 155 with the reduced ends 156 of the master-bar 35, already referred to. The cam 150 acts on the pin 157 (see Fig. 4) of the arm or crank 158, which is, at its lower end, keyed to the shaft 159, which extends transversely through the machine-frame and has at its outer end a similar arm 158, (see Fig. 2,) the two arms 158 being slotted at their upper ends, as shown at 160 in Fig. 4, and connected to the reduced ends of the master-bar 35$^a$, so that the movement of the bar is given to it positively by the arm 158. Cam 149 acts on the pin 161 of the arm 162, which at its lower end is keyed to the shaft 163 and this extends transversely through the machine and has at its opposite ends a similar arm 162, the two said arms connecting, by pivotal links 164, to the master-bar 70 of the finger-bars 68. The pinion 146 (see Figs. 3 and 17) carries an arm 165, which turns with it, and on this arm is pivoted the pawl 166, (see Figs. 4 and 17,) which is pressed by a spring 167 into engagement with the single-tooth ratchet-wheel 168. When the lever 138 is pulled down, the pawl 166 is in engagement with the ratchet-wheel, and the hub 147, with its cams 149, 150, and 151, receives the same degree of rotation as the gear or pinion 146. On the release of the lever it is pulled back by the spring 143, and the segment 141 in returning rotates the gear 146 in the opposite direction, thus causing the pawl 166 to pass back over the tooth of the ratchet-wheel 168 and drop down over the tooth in the first position. The cams 149, 150, 151, and the segment 168$^a$ are keyed to the hub 147 by the key 147$^a$, (see Fig. 17,) so that all the said parts turn with the hub. The cam-hub 147 carries also on the under side a segment 168$^a$, which is provided on one edge with teeth 169 and on the opposite edge with teeth 170, (see Fig. 3,) the first teeth meshing with the pinion 171 and the second with the pinion 172, these pinions being fixed to the inwardly-extending horizontal shafts carried in the bosses 173 and 174 of the machine-frame, the pinion 171 carrying the bevel-pinion 175, and the pinion 172 carrying the beveled pinion 176, these beveled pinions meshing, respectively, with the bevel-gears 177 and 178 on the shaft 179, which is journaled in the two cross pieces or frames 10$^a$ on the main frame 10, and the said shaft projects through the said cross-frames and is provided with gears 180, which connect, through the intermediate gears 181, with a train of gears on the front and rear portions of the said cross-frames 10$^a$, the train-gearing comprising the relatively large gears 182, 182$^a$, and 182$^b$ and the intermediate gears 183 and 183$^a$. The gears 182, 182$^a$, and 182$^b$ mesh with the racks 184, which are secured to projecting plates 185 of the calculator-carriage 76, (see Fig. 6,) so that when the gears turn in one direction the carriage will be moved rapidly across the machine from right to left as you face the machine, and when the gears are reversed the carriage will be also reversed.

From the description just above given it will be seen that when the segment 141 moves in one direction the teeth 169 of the segment 168$^a$ will engage the pinion 171, and so move the carriage from right to left through the connected gearing, already described; but on the continued movement of the segment 168$^a$ the teeth 170 of the segment acting on the pinion 172, and through that and the connecting-gear just referred to, will reverse the carriage movement.

The fourth cam 152 of the hub 147 acts on the lever or arm 129 of the shaft 128, which rests normally against the cam. When the hub 147 is rotated, the cam rotates with it and holds the arm 129 in the position shown in Fig. 2 until the cam clears the end of the arm, when the arm flies up to the position shown in Fig. 9 and remains in this position till the plate-cam 152 in its continued rotation comes round and, contacting again with the arm, forces it gradually to its first position. When the cam releases the lever or arm 129, it permits the spring 130 to move forward the indicator rack-bars 123, as already described.

The different parts of the mechanism are actuated in the following order: After the keys 14, communicating the numbers to be computed, are pressed the lever 138 is pulled down and the cams on the hub 147 are rotated, as already described. The cam 151 clears the pin 153$^a$ of the levers or arms 153, which permits the forward motion of the master-bar 35 and the several rack-bars 46, these moving forward to the point where the step ends 44 of the governing rack-bars 42 strike the depressed keys, which prevents their further movement. By the movement of these rack-bars the disks 53 are rotated till in each case the first subsector of one of their sectors is before or in alinement with the finger 67 of one of the finger-bars 68. The cam 150 clears the pin 157 of the arms 158, permitting the master-bar 35$^a$ of the rack-bars 45 to move forward till their governing rack-bars 43 are prevented from further movement by the keys 14 that control them, and this movement, as already described, through the instrumentality of the spurs 50 and the pins 52, gives the disks 53 a slight additional movement, bringing the particular subsectors of the disks necessary to the calculation, as shown by the keys, opposite the fingers 67 of the appropriate finger-bars 68. By this time the hub 147 has moved sufficiently for the cam 149 to clear or free the pin 161 of the arms 162, thus permitting the inward movement of the master-bar 70, controlling the finger-bars 68, and this allows the fingers 67 to enter the recess of the disks 53, setting the rack-plates 73 and following in the desired combination. At this time the teeth 169 of the segment 168$^a$ reach the point where they engage the pinion 171, thus running the carriage completely across the machine, as previously described. During the movement of the carriage it counts and computes the teeth presented to its counting-pinions 74 and 75 in the manner already described and stops in position to allow the arms to register the computation from the carriage-disks 94 and 95 to the dials 135 above. The plate-cam 152 now clears the end of the arm 129 and permits the arm to fall back, thus allowing the rack-bars 123 to slide and permitting the tilting of the arms 120 to 120$^d$ and 110 to 110$^d$, so that the latter arms come into contact with the disks 94 and 94$^a$ of the carriage 76. The result is now registered on the dials by means of the mechanism connecting the disks 94 and 94$^a$ with the dials, as already described, and nothing remains to be done but to return the parts to their original position. The hub 147 continues its rotation and the cam 149, acting on the pin 161, brings the master-bar 70, and with it the finger-bar 68, back to normal position. Next the cam 150, acting on the pin 157 and arms 158, brings back the master-bar 35$^a$ and the rack-bars 45 to normal position. Now the cam 151 engages the pin 153$^a$ and brings back, through the arms 153 and pitmen 155, the master-bar 35 to normal position, and this brings with it the rack-bars 46 and with the bars the disks 53, while almost simultaneously with the action of the cam 151 upon the pin 153$^a$ the teeth 171 of the segment 168$^a$ engage the pinion 172 and start the carriage on its return movement. When the carriage reaches its first position, the pins 108$^a$ of the disks 94 and 94$^a$ strike the arms 109, bringing all of the disks into line and in zero position. During these several operations the plate-cam 152 has contacted with and pressed down and back the lever or arm 129$^a$, thus carrying back the indicator rack-bars 123, and this turns their indicators back to zero position. The master-bar 35, besides acting on the rack-bars 42 and 46, has also by this time brought back the trip-bar 33, thereby releasing keys through the instrumentality of the spur 32 and pin or bent arm 31, so as to release the said keys, and the machine is now back in zero position, ready for its next calculation.

The action and sequence of movement of the various mechanical elements being now understood, I shall next explain the arithmetical principle of the machine. In the ordinary working out of an example in multiplication, the operation is carried out in the well-known way, as follows:

```
157  1-2
 25  1-3
 ─────────
 52  1-2
787  1-2
315
─────────
3990
```

The multiplicand one hundred and fifty-seven and one-half is multiplied successively by one-third, by five, and by twenty, the answer to these elementary multiplications afterward being added together to get the result of the whole multiplication. The operation is carried out by my machine exactly in the same manner, except that I reduce the multiplication to a greater number of elements, in fact, to its simplest elements. By my mechanical method of multiplying one hundred and fifty-seven and one-half by twenty-five and one-third the machine analyzes the operation as follows:

```
157 1-2 × 25 1-3

100 ×  20  = 2000
 50 ×  20  = 1000
  7 ×  20  =   40
100 ×   5  =  500
 50 ×   5  =  250
  7 ×   5  =   35
100 × 1-3  =   33 1-3
 50 × 1-3  =   16 2-3
  7 × 1-3  =    2 1-3
1-2 × 1-3  =    1-6
1-2 ×  20  =   10
1-2 ×   5  =    2 1-2
           ────────
             3990
``` first producing all the elementary computations or primary calculations and then adding them together and indicating the result. In Fig. 1 is shown a diagram of each of the primary calculator-disks which go to make up the various groups, as in Fig. 7, the disks comprising $53^a$ $53^b$ $53^c$ $53^d$ $53^e$ $53^f$ $53^g$ $53^h$ $53^i$ $53^j$ $53^k$. So much of the principle of these disks as is necessary to the understanding of the operation of the machine has been already described, and the construction will now be referred to as a whole. The disks, it will be noticed, are formed upon a peripheral circle inside of which at regular intervals are described nine concentric circles stepped off, as already described. The peripheral circle is divided into nine equal sectors, and each sector into ten subsectors. These disks perform in the machine an office similar to that of multiplying in the human mind and are, in fact, a mechanical multiplication-table. The disks $53^i$ and $53^j$ give the multiplication of the digits "1" to "9" by the digits "1" to "9," and these two disks are therefore complementary to each other, the disk $53^i$ giving all the units of the products, and the disks $53^j$ giving the tens of the products. These disks are always paired and in the machine are operated as a mechanical unit. The first subsector of each sector is left full to the peripheral circle. The sector 1 contains the multiplication of all the digits by one. The subsector after the first or zero subsector of sector 1, it will be seen, is recessed to the first concentric circle, and this represents the product of one multiplied by one, which is one. The second subsector is recessed to the second circle and represents the product of two multiplied by one, which is two. It will be readily seen how the plan obtains throughout the whole of the first sector. The first subsector of the second sector is the starting-point of that sector and is "0." The subsector 1 is recessed to the second circle and represents the product of one multiplied by two, which is two. The next subsector 2 recedes to the fourth circle and represents the product of two multiplied by two, which is four. The third subsector recedes to the sixth circle and represents "6," the product of three multiplied by two. Until the multiplication reaches five multiplied by two the complementary disk $53^j$ is not recessed, but at that point it is recessed to the first circle, while the disk $53^i$ at the corresponding subsector is not recessed. Thus the two disks at that point represent the product of five multiplied by two, which is ten. It will now be seen how this principle is carried forward through the nine subsectors. The disks $53^e$ $53^f$ $53^g$ $53^h$ $53^k$ give the products of all the digits multiplied successively by all the fractions one-sixth, one-third, one-half, two-thirds, and five-sixths in the same manner that the two disks just above mentioned give their products. While these disks just above mentioned are of the same size and are divided into the same number of sectors as the disks $53^i$ and $53^j$, because there are only five keys on the key-bank controlling them, and therefore only five products in each ascending multiplication, there are in each sector only five active subsectors besides the zero subsectors. As I have arranged the active subsectors they are in the middle of the sector, with two inactive subsectors preceding and two following them. This particular arrangement of the active subsectors is not arbitrary. They could, if desired, follow immediately after the zero subsector in each sector, in which case, of course, the keys controlling them would have to commence in line with the "1" keys of the other banks instead of in line with the "3" keys of the other banks, as I have placed them.

In illustration of the principle and arrangement of the recesses of the fraction-disks, I will explain the group D. This group is made up of one disk $53^f$ and one disk $53^e$. In referring to the subsectors during this description I shall ignore the zero subsector, as its presence and office have already been clearly explained. The two disks acting as a single part give all the products of one to nine multiplied by all the fractions, one-sixth to five-sixths. The sector 2 of this group gives the product of one multiplied by all the fractions. The answer of one multiplied by one-sixth is one-sixth, and it will be seen that the disk $53^e$, which registers the fractions of this group's products, is recessed to the first circle in the first subsector, while at the same point disk $53^f$, which registers the units of this group's products, is not recessed at all. Thus the elementary calculation given by this subsector is one-sixth. The second subsector of the same sector is adapted to give the result of one multiplied by one-third and is recessed in $53^e$ to the second circle, and at the same point in $53^f$ is not recessed at all. The elementary calculation given by this subsector is therefore two-sixths or one-third. It will be easy to follow the process out through the remaining subsectors of this sector. In sector 2 of this group are the products of two multiplied by all the fractions, one-sixth to five-sixths. At the first subsector it will be seen that $53^e$ is recessed to the second circle, while $53^f$ is not recessed at all. This gives the product of two multiplied by one-sixth, which is one-third. The next subsector is not recessed on $53^f$, but on $53^e$ is recessed to the fourth circle, which gives the result of two multiplied by one-third, which is four-sixths or two-thirds. The third subsector is recessed on $53^f$ to the first circle, but on $53^e$ is not recessed. This gives the result of two multiplied by one-half, which is one. This method, as in the case of the whole-number disks, is carried out consistently through all the sectors. I will now give an example on the largest group I, which is made up of one each of the disks $53^f$, $53^g$, $53^h$, and $53^k$, all held fast on the same hub, as already described. This group appears best in Fig. 7 and is adapted in the machine now being described to produce the multiplication of one hundred to nine hundred by the fractions one-sixth to five-sixths. If it is desired to obtain the multiplication of eight hundred by five-sixths, the group is actuated so as to bring that subsector of the disks before the fingers 67. The product of eight hundred multiplied by five-sixths is six hundred and sixty-six and four-sixths. Now by referring to the eighth sector of the disks $53^f$, $53^g$, $53^h$, and $53^k$ and the fifth active subsector or step of that sector it will be seen that $53^f$, $53^g$, and $53^h$ are recessed to the sixth concentric circle, while $53^k$ is recessed only to the fourth circle. The group D is composed of one each of the disks $53^i$ and $53^j$, and the group H is composed of one each of the disks $53^f$, $53^h$, and $53^k$. The group J gives the product of one-half multiplied successively by all of the digits in the units-place. The group K gives the products of one-half multiplied by the digits in the tens-place. The group L gives the products of one-half multiplied by all the fractions, one-sixth to five-sixths. As there is only one key on the half-key bank, there is of course only one active sector on the disks controlled by that key-bank and only one pin 52 for the spur 50, covering each group to act upon. The group L consists, as seen, of only one disk, $53^d$, but it is termed a "group" for uniformity. The group K consists of a disk $53^c$ and a disk $53^a$. The group J consists of a disk $53^b$ and a disk $53^a$.

It will be understood that only one set of pins 52 is required by each group, and it makes no difference into which disk the pins are fastened, that being dependent upon the arrangement of the communicating rack-bars. It is not necessary to arrange the disks upon their hubs in the consecutive order that their individual products would read. All that is necessary is to fasten the rack-plate 73 complementary to the disk at that point on the finger-bar 68 where it will communicate with the counting-pinion 74 or 75 of the calculator-carriage 76 which represents figures of an equal value with the disk. Thus if a disk occupies a tens place in the product of the group the rack-plate 73 of its corresponding finger-bar 68 must be in the series adapted to act on the tens-pinion 74 of the calculator-carriage 76, and this can be done no matter what the position of the disk in its group. The lowest fraction which the machine is adapted to produce in its answers is one-twelfth, and it is therefore necessary that all its fractional computations be reduced to the same denomination, the indicating mechanism always expressing the fractions in its lowest terms. Thus disks 53, therefore, which produce "$\frac{1}{6}$," must be fitted with rack-plates 73, which will present teeth in twelfths, so that all the teeth of the fraction series shall agree in terms.

In the machine it will be seen that no consistent arrangement of the groups of disks 53 or of the disks upon their hubs has been observed, the order being governed entirely by convenience in arranging the various parts. In illustration of this attention is again called to the group I. Here the consecutive order of the disks would be $53^f$, $53^g$, $53^h$, and $53^k$; but it will be seen that the observed order is $53^h$, $53^g$, $53^k$, and $53^f$. Now in the result of any computation of this group $53^f$ occupies the hundreds place, $53^g$ the tens place, $53^h$ the units place, and $53^k$ the fractions place. By reference to Fig. 7 it will be seen that each of these disks has the rack-plate 73 of its finger-bar 68 placed according to these values.

The following is a table showing how the disk groups are arranged and the elemental computations each group is adapted to perform in any computation.

L......1-2 .................................... × 1-6, 1-3, 1-2, 2-3, 5-6

K......1-2 .................................... × 10, 20, 30, 40, 50, 60, 70, 80, 90

J......1-2 .................................... × 1, 2, 3, 4, 5, 6, 7, 8, 9

I......100, 200, 300, 400, 500, 600, 700, 800, 900 ............... × 1-6, 1-3, 1-2, 2-3, 5-6

H......10, 20, 30, 40, 50, 60, 70, 80, 90 ...................... × 1-6, 1-3, 1-2, 2-3, 5-6

G......10, 20, 30, 40, 50, 60, 70, 80, 90 ...................... × 10, 20, 30, 40, 50, 60, 70, 80, 90

F......100, 200, 300, 400, 500, 600, 700, 800, 900 ............... × 10, 20, 30, 40, 50, 60, 70, 80, 90

E......1, 2, 3, 4, 5, 6, 7, 8, 9 .............................. × 10, 20, 30, 40, 50, 60, 70, 80, 90

D......1, 2, 3, 4, 5, 6, 7, 8, 9 .............................. × 1-6, 1-3, 1-2, 2-3, 5-6

```
                                                       1
                                                       2
                                                       3
                                                       4
    C......10, 20, 30, 40, 50, 60, 70, 80, 90 ....... ×5
                                                       6
                                                       7
                                                       8
                                                       9

1
                                                       2
                                                       3
                                                       4
    B......100, 200, 300, 400, 500, 600, 700, 800, 900 ....... ×5
                                                       6
                                                       7
                                                       8
                                                       9

1
                                                       2
                                                       3
                                                       4
    A......1, 2, 3, 4, 5, 6, 7, 8, 9 .............. ×5
                                                       6
                                                       7
                                                       8
                                                       9
```

To complete the explanation of the theory upon which the machine performs its operations, it is now only necessary to describe the manner in which the communicating mechanism conveys the numbers indicated by the depressed keys to the various disk groups. It has already been explained how each bank of keys controls one of the shafts 47 to $47^f$, and by reference to Fig. 8 the controlling mechanism is shown in position to cause the calculating mechanism to multiply one hundred and fifty-seven and one-half by twenty-five and one-third. The system of shaft and racks will be understood. The four banks of multiplicand-keys 13, which are the four banks at the left of the keyboard as you face it, control, respectively, the shafts $47^b$, $47^a$, 47, and $47^c$, taking the key-banks in order from left to right. These shafts, it will be remembered, actuate, by means of their pinions 48, the rack-bars 46, which have the teeth 51. The three key-banks to the right of the keyboard, which are the multiplier-keys, control, respectively, taking the key-banks from left to right, the shafts $47^f$, $47^e$, and $47^d$, and it will be remembered that these shafts control the rack-bars 45, having the spurs 50.

All the primary calculations which the disks produce are determined by pairing a toothed rack-bar 46 with a spur rack-bar 45—that is, having a disk group controlled as to its sector by the toothed rack-bar 46 and as to its subsectors by a spurred rack-bar 45. In Fig. 8 the feet or bent ends $13^a$ of the keys 13, representing the numbers to be computed together, are shown with one of the stops of the forward end of the rack-bars 42 and 43 in abutment with them, and all the rack-bars 42, 43, 45, and 46 are shown occupying the respective positions into which this action of the governing rack-bars 42 and 43 brings them. The multiplicand-keys depressed are of course "1" on the first bank, "5" on the second bank, "7" on the third bank, and "½" on the fourth bank. The keys depressed on the multiplier-banks are, reading in the same order, "2" on the first bank, "5" on the second bank, and "⅓" on the third bank. The "1" key on the multiplicand represents one hundred. Therefore that fact is communicated to the three disk groups 53, adapted to give the products of the multiplication of hundreds by rotating them to the first sector and stopping them with the zero subsector of that sector before the fingers $7^a$. This one hundred has to be multiplied by twenty, by five, and by one-third. By reference to the figure it will be seen that each of the disk groups in the control of the one hundreds' key-bank is in turn under the secondary control through one of the rack-bars 45, having the spur 50 of the key-banks upon which the multiplier "25⅓" is indicated, one controlled by "20," one by "5," and one by "⅓." This arrangement obtains throughout the machine. Each one of the multiplicand-keys controls three disk groups, which are in turn controlled from the multiplier-banks, one by the tens, one by the units, and one by the fractions.

From the foregoing description it will be seen that I have described a machine which is operative for carrying out the computations described; but it is evident that a machine of this nature must be more or less complex, that the design of the machine in its entirety and in its parts can be changed greatly without affecting its principles, that weights can be substituted for springs in most instances, that even positive movements can be substituted for the spring movements, and that the general appearance of the machine can be changed without altering its principles, and therefore I do not restrict myself to the details of construction shown except where the details are vital, as pointed out. It will also be noticed that I produce a machine which will perform problems of multiplication and which by a single movement of the lever causes the mechanical operations to be completely performed, and it will be understood that the detail mechanism for doing this at a single operation may be considerably changed without affecting the general features of the invention.

Having thus described my invention, what I claim as new, and desire to secure by Letters Patent, is—

1. In a multiplying-machine, the combination of means for setting up a multiplicand, means for setting up a multiplier of two or more digits, and means when put into operation, to perform multiplication by producing the partial products each of which is formed by actually multiplying together numerals of the multiplicand and multiplier and adding them together.

2. In a multiplying-machine, the combination of means for setting up a multiplicand, means for setting up a multiplier of two or more digits, and means when put into operation, to perform multiplication by producing partial products each of which is formed by actually multiplying together numerals of the multiplicand and multiplier, adding them together and registering the result.

3. In a multiplying-machine, the combination of means for setting up a multiplicand, means for setting up a multiplier of two or more digits, and means when put into operation, to perform multiplication by producing partial products, each partial product being formed by multiplying separately the units, tens, hundreds, &c., of the multiplicand by each separate numeral of the multiplier, adding together the several partial products, thus formed, and registering the result.

4. A calculating-machine comprising the following groups of mechanism: a keyboard, a primary calculator governed by the depression of keys on the keyboard and designed to set certain gearing in a position determined by the keys, a secondary calculator-carriage having pinions which the movement of the carriage causes to engage the gearing set by primary calculator, registering mechanism to indicate the result of a computation, and actuating mechanism to move the several parts of the machine.

5. A calculating-machine comprising a key-bank having depressible numbered keys, a primary calculator the movement of which is controlled by the depression of keys in the key-bank so as to position gear-teeth representing the keys depressed, a secondary calculator-carriage having gears which the movement of the carriage causes to engage the positioned teeth of the primary calculator and compute the number of teeth, registering mechanism to register the computation made, and actuating mechanism for moving the several parts.

6. A calculating-machine comprising groups of depressible keys, a primary calculator controlled by the depressed keys and arranged to move rack-plates to a position determined by the keys, a carriage traversing the primary calculator mechanism, and having gears to engage the rack-plates aforesaid, mechanism on the carriage to compute the numbers represented by the gear movements, and registering mechanism to register the result of the computation.

7. A calculating-machine comprising a bank of depressible numbered keys, a primary calculator controlled by the keys and arranged to place gear-teeth into positions determined by the keys, communicating mechanism to communicate from the depressed keys the requisite movement to the primary calculator, a carriage traversing the primary calculator and having gears to engage the teeth positioned by the said calculator, mechanism on the carriage to compute the result of the gear movements aforesaid, a registering device to indicate the result of a computation, and an operative connection between the registering device and the carriage mechanism.

8. A calculating-machine comprising a key-bank having numbered depressible keys arranged in groups, a primary calculator having sliding rack-plates with teeth thereon corresponding to multiples of the numbers of the keys, communicating mechanism between the keys and the primary calculator whereby the primary calculator is caused to move into certain lines the number of teeth corresponding to the number of depressed keys, a carriage traversing the primary calculator having gears to engage the aforesaid teeth, mechanism mounted on the carriage for computing the results of the engaging gears and teeth, a registering device to indicate the result of a computation, and an operative connection between the registering device and the carriage mechanism.

9. A calculating-machine comprising a key-bank having groups of depressible keys representing the digits and fractions thereof, a primary calculator arranged to position a series of rack-plates so that the teeth of the rack-plates along certain lines shall correspond to multiples of the numbers represented by certain depressed keys, communicating mechanism between the keys and the primary calculator to determine the movements of the said calculator, a carriage traversing the primary calculator and having gears or pinions to engage the rack-plates aforesaid, mechanism mounted on the carriage and actuated by the pinions or gears thereof to compute the calculations represented by the meshing teeth and gears of the primary calculator and carriage, a registering device, and mechanism actuated by the carriage to transfer to the registering device the computation represented by the mechanism of the carriage.

10. A calculating-machine comprising a key-bank having groups of depressible keys, a primary calculator, a series of rack-plates positioned by the primary calculator so as to bring into lines the number of teeth corresponding to multiples of the numbers of the depressed keys, communicating mechanism for communicating to the primary calculator the numbers represented by the depressed keys, a locking device released by the depression of the keys and serving to prevent the movements of the primary calculator, the secondary calculator or carriage traversing the primary calculator and provided with gears or pinions to engage the aforesaid rack-plates, mechanism on the carriage actuated by the gearing to compute the calculations represented by the teeth of the carriage-gearing as they mesh with the rack-plates, a registering device to register the computations of the carriage, an operative connection between the carriage and the registering device, and actuating mechanism for moving the aforesaid parts.

11. The combination with the depressible keys, the spring-pressed slide-bar movable opposite the keys, and the locking device operated by the movement of the slide-bar to lock and release the keys, of a sliding trip-bar, means for moving the trip-bar by the operation of the machine, and an operative connection between the trip-bar and the slide-bar whereby the movement of the trip-bar permits the slide-bar to return to its normal position and to release the keys.

12. In a calculating-machine, the combination with the primary calculator mechanism arranged to control the movements of a series of rack-plates so as to bring certain numbers of teeth along predetermined lines, of the longitudinally-sliding governing rack-bars actuating the primary calculator, a locking device to prevent the accidental movement of the governing rack-bars, depressible keys, and mechanism operated by the depression of the keys to trip and release the rack-bars.

13. In a calculating-machine, key-controlled mechanism to place a desired number of teeth along certain lines, and a carriage moving opposite the teeth and having computing mechanism driven by the teeth, and acting by a single complete movement of the carriage to carry forward and register in appropriate periods of notation the numbers represented by the key-positioned teeth.

14. In a calculating-machine, a group of keys representing the multiplicand, a group of keys representing the multiplier, devices selected and positioned by the keys, and mechanism operated by a single lever-stroke to traverse and engage the said key-positioned devices, the said traversing mechanism operating to totalize the numbers represented by the devices set up by the keys.

15. In a calculating-machine, a group of keys representing the multiplicand, a group of keys representing the multiplier, devices selected and positioned by the keys, and mechanism operated by a single lever-stroke to add together the numbers represented by the key-positioned devices.

16. In a calculating-machine, a group of keys representing the multiplicand, a group of keys representing the multiplier, driving means selected and positioned by the keys, and a carriage reciprocated opposite and having computing mechanism operated by engagement with the driving means and adapted at one operation to multiply the numbers selected by one key group by the numbers selected by the second key group and to indicate the product.

17. In a calculating-machine, the combination of the depressible numbered keys arranged in groups or banks, a series of rotatable disks arranged in groups corresponding to the key-banks and recessed radially as described, a series of governing rack-bars positioned by the depression of certain keys, a series of sliding rack-bars controlled by the governing rack-bars and adapted to actuate the aforesaid recessed disks, a series of rack-plates positioned by the recessed disks and having progressively-changing numbers of teeth, and a computing device traversing the rack-plates and having actuating-gears engaging the said rack-plates.

18. In a calculating-machine, the combination with the sliding rack-bars arranged in groups, a key-actuated mechanism for controlling the movement of the said sliding rack-bars, a series of rack-plates having progressively-varying numbers of teeth, a gear connection between certain sliding rack-bars of each group whereby the several rack-bars of the groups are simultaneously and correspondingly moved so that the operated rack-plates will represent, tens, hundreds, &c., of certain calculations, mechanism controlled by the movement of the sliding rack-bars to position the rack-plates, a movable carriage having gears to engage the rack-plates, and computing mechanism mounted on the carriage and operated by the movement of its gears as they engage the rack-plates.

19. A calculating-machine comprising a key-bank, a series of radially-recessed disks, the depths of the recesses corresponding to the numbers on the keys, sliding rack-bars to engage and position the disks, governing rack-bars controlled by the keys and regulating the movement of the sliding rack-bars and disks, a series of movable finger-bars engaging the peripheries of the recessed disks and limited in their movement by the disks, a series of gear-teeth carried by the finger-bars and arranged so that the number of teeth along certain lines is determined by the movement of said finger-bars, a carriage movable transversely of the finger-bars and having gears to engage the teeth above mentioned, and computing mechanism on the carriage operated by the meshing of the carriage-gears with the aforesaid teeth.

20. In a calculating-machine, the combination with the sliding spring-pressed governing rack-bars, the keys adapted to limit the movement of the governing rack-bars, a series of sliding rack-bars controlled and moved by the governing rack-bars, calculating mechanism operated by the sliding rack-bars, and means as the master-bars engaging the governing rack-bars and sliding rack-bars to return them both to normal position.

21. In a calculating-machine, the combination of the radially-recessed primary calculator-disks divided into sectors with each sector recessed radially so that the bottoms of the recesses correspond to certain numbers, the key-controlled sliding rack-bars engaging the aforesaid disks, so as to bring certain sectors thereof to position, the second key-controlled rack-bars adapted to engage the disks and bring the subsectors of each sector to a predetermined position, a series of sliding rack-plates having progressively-varying numbers of teeth, carrying means for the rack-plates, the said carrying means engaging the recessed calculator-disks and being limited thereby, a carriage movable across the rack-plates, pinions on the carriage to engage the rack-plates, and computing mechanism on the carriage actuated by the engagement of the pinions and rack-plates.

22. In a calculating-machine, the combination with the primary calculator-disks divided into sectors and each sector subdivided by peripheral recesses, so that the depth of the recesses shall represent numbers, sliding rack-bars arranged to actuate the disks and bring the sectors to position, a second set of sliding rack-bars to give the disks an additional movement so as to position their subsectors, and means as the slots in the two sets of rack-bars and the two master-bars, traversing the slots to permit the successive movement of the rack-bars.

23. In a calculating-machine, the combination with the primary calculator-disks each divided into nine sectors with each sector divided into subsectors representing numbers, of hubs carrying the disks, means for permitting a limited movement of each disk on its hub, a set of sliding rack-bars geared to the hubs, means for actuating the rack-bars so as to turn the sectors of the disks to position, and a second set of rack-bars engaging the disks and turning them on their hubs so as to position the subsectors.

24. In a calculating-machine, the combination with the depressible keys, the sliding governing rack-bars directly controlled as to their movement by the keys, a plural series of sliding rack-bars, each series of rack-bars having a gear connection with its governing rack-bar, a series of rotatable primary calculator-disks, each disk being radially divided into sectors, and each sector peripherally and radially recessed the depths of the recesses corresponding to numbers, a connection between the sliding rack-bars and the calculator-disks whereby one set of rack-bars positions the disk-sectors and the second set of rack-bars positions the subsectors of the disk, a series of rack-plates having progressively-varying teeth, finger-bars carrying the rack-plates and pressing peripherally on the disks whereby the position of the rack-plates is determined, a movable carriage having computing mechanism, and gears actuating the computing mechanism and arranged to engage the aforesaid rack-plates.

25. In a calculating-machine the combination with the primary calculator-disks, each divided into nine sectors and each sector subdivided into radial recesses of varying depths, of key-controlled rack-bars arranged in sets, one set being geared to the hubs of the disks so as to fix the position of the sectors and the second set of rack-bars connecting with disks so as to give them a slight additional movement and fix the position of their recesses, finger-bars pressing peripherally on the disks and engaging the recesses thereof, and computing mechanism controlled by the position of the finger-bars in relation to the recesses of the disks.

26. In a calculating-machine, the combination with the primary calculator-disks, each divided into radial sectors and each sector subdivided by radial recesses of varying depth so as to represent numbers, of hubs carrying the disks so that each disk can move the distance of a sector on its hub, key-controlled sliding rack-bars gearing into the hubs so as to bring the hubs and disks to a predetermined position with reference to the sectors, a second set of sliding rack-bars having means as the spurs on the rack-bars and the pins on the calculator-disks to bring the recesses of the disks to predetermined positions, finger-bars pressing the peripheries of the disk and engaging the recesses, rack-plates moved by the finger-bars so that the number of teeth on the plates which are brought to a certain position corresponds to the numbers which are represented by the depth of the disk-recesses, a carriage movable opposite the rack-plates, computing mechanism on the carriage, and gears on the carriage arranged to engage the rack-plates and drive the computing mechanism.

27. In a calculating-machine, the combination with the primary calculator-disks, of the slotted governing rack-bars, the slotted sliding rack-bars controlled by the governing rack-bars and arranged to engage and move the disks, the slotted finger-bars to engage the disk, and the master-bars traversing the slots of all the aforementioned bars, and adapted to return the governing rack-bars, sliding rack-bars and finger-bars to normal position.

28. In a calculating-machine, the combination with the key-controlled calculator-disks having radial recesses of varying depths, and the finger-bars pressed toward the peripheries of the disks, the said finger-bars being adapted to carry forward the calculations of the disks as described, of the check-levers engaging the finger-bars to prevent their movement toward the disks, and means for releasing the check-levers and finger-bars by slight movement of the disks.

29. In a calculating-machine, the combination with the key-controlled and radially-recessed calculator-disks, of the finger-bars controlling the mechanism for carrying forward the calculations, said finger-bars being pressed forward toward the peripheries of the disks, a check-lever for each group of finger-bars, said lever being adapted to engage an abutment on the finger-bar and prevent the movement of the finger-bar toward the disk, and means, as the cam-face of the check-lever and the pin on the disk, for releasing the check-lever and finger-bar.

30. In a calculating-machine, the combination with a series of rack-plates having progressively-varying numbers of teeth, a second series of rack-plates having a progressively-varying number of teeth representing fractions of a denomination corresponding to the number of teeth on the rack-plates, and key-controlled mechanism for placing the rack-plates and alining them with the pinions of the carriage, a carriage movable opposite the rack-plates and divided into sections representing various denominations of notation, and also representing fractions, pinions in each section to engage the teeth of the aforesaid rack-plates, carrying mechanism whereby the fractional amounts will be carried to the units-section, the units to the tens and so on, and registering mechanism operatively connected with the carriage to register and indicate the computations of the carriage.

31. The combination with a calculating-machine having key-controlled mechanism for placing certain rack-plates or gears in predetermined lines with the number of teeth in the lines corresponding to multiples of the depressed keys of the machine, of a carriage traversing the machine and divided into sections representing progressing increasing denominations of notation, and pinions carried by each carriage-section to engage the rack-plates, computing mechanism on the carriage operated by the rotation of the aforesaid pinions, and mechanism for carrying forward and registering the carriage computations.

32. In a calculating-machine, the combination with computing mechanism controlled by shifting teeth or gears, of the primary calculator-disks governing the position of the said teeth or gears by peripherally engaging the means for carrying the teeth or gears, said disks being divided into nine sectors with each sector subdivided into ten radial and concentric subsectors or abutments, the said subsectors or abutments corresponding to certain numbers and by their radial position fixing the position of the aforesaid teeth or gears.

33. In a calculating-machine, the combination of the primary calculator-disks arranged in groups on a single hub, the disks being rotatable with the hub and also to a limited extent thereon, the limitation being caused by a segmental recess in the hub-flange and a limiting-arm movable in unison with the disk and moving in the segmental recess of the hub-flange.

34. In a calculating-machine the combination with the moving carriage, of the key-controlled gearing thereon, a disk carried by the key-controlled gearing and provided with concentric abutments, arms engaging the said abutments and the register or indicator actuated by the arms.

35. In a calculating-machine, the combination with key-controlled racks or gears arranged in series representing different denominations or periods of notation, of a carriage traversing the machine and made up in sections representing denominations or periods of notation, each section having a pinion to engage the aforesaid rack-plates, carrying mechanism for carrying forward from section to section of the carriage the tens, hundreds, &c., disks for each carriage-section, said disks having concentrically-arranged abutments representing the digits or fractions, as the case may be, a series of arms in the path of the carriage to engage the abutments of the disks, and a registering device controlled by the movement of the arms.

36. In a calculating-machine, the combination with the movable carriage having the secondary calculator-disks with concentric steps or abutments thereon, of means for turning the said disks or abutments back to zero position at each stroke or movement of the carriage.

37. In a calculating-machine, the combination with the carriage, divided into sections representing fractions, units, tens, &c., and the controlled gears on the carriage, of the carrying means, comprising a clutch having separable members separated by the movement of the gearing and returning suddenly at the tenth step thereof, and a ratchet mechanism actuated by the clutch and carrying forward the computation to the next higher carriage-section.

38. In a machine of the kind described, having a calculator-carriage movable therein, the combination of adjoining carriage-sections each comprising a key-controlled gear, a radially-recessed disk on an independent journal to carry forward the movements of the gear, a ratchet-wheel turning the disk, a sliding spring-pressed cone moved against the spring by the movement of the gear in the section below, and a tilting arm and pawl carried by the gear of one section, the said arm being actuated by the movement of the cone of its section and serving to move the pawl and ratchet-wheel so as to turn the radially-recessed disk.

39. In a calculating-machine, a carriage comprising a series of sections representing fractions, units, tens, &c., a key-controlled gear-wheel on each section, a disk for each section, said disk being provided with radial recesses or abutments to connect with register-transmitting mechanism, a ratchet connection between the disk of each section and its gear-wheel whereby at the tenth-tooth movement of the gear-wheel, the disk will be advanced, and an operative connection between the disk of one section and the mechanism of the section below, whereby the disk may be advanced a tooth independently of its gear.

40. In a calculating-machine having a carriage movable in the machine, the combination of the key-controlled rotatable disks thereof, said disks having concentric abutments, the registering mechanism actuated by the abutments, and means as the ratchet-arms on the machine and the pins on the disk to return the disks to zero position at each stroke or movement of the carriage.

41. The combination with a calculating-machine, of a carriage movable therein and divided into sections, representing units, tens, hundreds, &c., a key-controlled gear for each carriage-section, a ratchet-wheel and disk turning together and independent of the gear, the disk having concentric abutments to engage mechanism for transmitting to a registering device, a shaft journaled in the gear and provided at one end with a bent arm carrying a pawl to engage the ratchet-wheel, and at the other end with second bent arm, and a sliding clutch for each section, the clutch being arranged at every tenth-tooth movement of the gear to tilt the arms of the aforesaid shaft and actuate the ratchet-wheel and its disk.

42. In a calculating-machine, the combination with the movable calculator-carriage and the disks thereon representing different denominations of notation, each section having a disk with concentric abutments representing the digits, of the registering device, means for normally locking the registering device, a series of arms to engage the abutments of the carriage-disks, an independent connection between each arm and each dial of the register, and means for automatically releasing the registering device to the action of the arms as the carriage reaches the limit of its stroke.

43. In a calculating-machine, the combination with the calculator-carriage having sections representing progressive denominations of notation and a registering device having a dial and shaft for each carriage-section, of a disk for each carriage-section having concentric abutments or steps representing the digits of the carriage-computations, a series of arms each adapted to engage one of the carriage-disks and an operative connection between each arm and the corresponding shaft and dial of the registering device whereby the numbers represented by the steps of the disk which contact with the arms shall be transmitted to the appropriate dial.

44. In a calculating-machine the combination with the calculator-carriage and the disks thereon having concentric abutments representing the computed digits of the carriage in the different denominations of notation, a registering device having a dial and shaft for each carriage-disk, arms to engage the steps or abutments of each carriage-disk, mechanism connecting each arm with its appropriate dial and shaft of the registering device, so that the tilting of the arms shall control the registering device, a locking mechanism to normally fix the position of the registering device, and means for returning the registering device to zero position after each actuation thereof.

45. In a calculating-machine the combination with the movable carriage and the secondary calculator-disks thereon, the disks representing the progressive denominations of notation, and a registering device having a dial and shaft for each carriage-disk, the sliding-indicator rack-bars geared to the dial-shafts, an independent arm and lever connection between each disk and each indicator rack-bar whereby the disks tilt the arms and slide the rack-bars, and automatic means for returning the rack-bars so as to move the dials to zero position and return the disk-engaging arms to their first position.

46. In a calculating-machine, the combination with the movable calculator-carriage and the key-controlled disks thereon, there being a disk for each period or denomination and each disk having also a series of concentric disks representing steps or abutments, of a shaft formed of a series of independently-turning sections arranged one within the other and of different lengths, a bent arm secured to each shaft-section and extending into the path of the abutments of the carriage-disks, a registering device having shafts and dials corresponding in number to the number of disks on the carriage, a series of levers connected to the several sections of the shaft, and sliding rack-bars actuating the levers and geared to the dial-shafts.

47. In a calculating-machine, the combination with the carriage and its calculator-disks, there being a disk for each period or denomination of notation and each disk having concentric steps representing digits of computation, of depending independent arms engaging the steps or abutments of the disks, sliding indicator rack-bars actuating each arm and each engaging a separate shaft of the registering device, a tilting arm or lever arranged to return and normally lock the indicator rack-bars, and means operated by the actuating mechanism of the machine to release the tilting arm and rack-bars.

48. In a calculating-machine, the combination with the carriage and its calculating-disks, each representing a separate denomination or period of notation, and each provided with concentric digit representing abutments, of the registering device having a separate dial and shaft for each carriage-disk, and an independent operative connection between each carriage-disk and its corresponding dial-shaft whereby the number represented by the particular abutment of the disk in connection with the transmitting mechanism shall move the appropriate dial the requisite distance.

49. In a calculating-machine, the combination with the carriage and its disks, each representing a period or denomination of notation and each having a series of concentric digit representing abutments, of the registering device having a dial and shaft for each disk, a series of spring-pressed sliding rack-bars geared to the several dial-shafts, depending arms to engage the abutments of the carriage-disks, an operative connection between each arm and its appropriate connecting rack-bar, and means as the spurs on the indicating rack-bars and the tilting arm and pin which engages the spurs to move the indicating rack-bars against the tension of their springs and to turn the dials back to zero.

50. In a calculating-machine, the combination with the movable carriage and its calculator-disks, there being a disk for each period of notation and the disks having concentric steps or abutments positioned by key-controlled mechanism, of the registering device having a dial and shaft for each carriage-disk, the sectional shaft made up of a series of sections of different lengths nested one within the other, an arm for each shaft-section, the said arms extending into the path of the disk-abutments, a series of sliding indicator rack-bars, each geared to one of the dial-shafts, a tilting arm or lever connecting each indicator rack-bar with one of the shaft-sections, depending spurs on the rack-bars, and a cam-actuated tilting arm or lever having means to engage the spurs and hold or move the indicator rack-bars.

51. In a calculating-machine, the combination with the key-positioned rack-plates, the carriage movable near the rack-plates and provided with computing mechanism having gears to engage the rack-plates, and the rotatable driving-shaft, of a train of gearing to engage and actuate the carriage, and a gear connection between the said train of gearing and the driving-shaft whereby a single continuous movement of the shaft will cause the carriage to move rapidly backward and forward through the machine.

52. In a machine of the kind described, the combination with the sliding governing rack-bars, the sliding rack-bars, and the key mechanism controlling the movements of the aforesaid governing rack-bars and rack-bars, of master-bars traversing the whole series of governing rack-bars and rack-bars, and a cam mechanism to move the master-bars and actuate the rack-bars and governing rack-bars thereby.

53. A calculating-machine comprising key-banks representing multiplicand and multiplier, and mechanism controlled by the keys of the key-banks and adapted at a single complete operation to multiply the numbers represented by the depressed keys of one bank by the depressed keys of the second bank.

In testimony whereof I have hereunto set my hand in the presence of two subscribing witnesses.

BERTRAM H. SAUNDERS.

In presence of—
WARREN B. HUTCHINSON,
JOHN G. DUNBAR.